(12) United States Patent
Becker et al.

(10) Patent No.: US 8,530,582 B2
(45) Date of Patent: *Sep. 10, 2013

(54) MODIFIED POLYOLEFINS WITH AN EXCEPTIONAL PROFILE OF PROPERTIES, PROCESS FOR PREPARATION THEREOF AND USE THEREOF

(75) Inventors: Hinnerk Gordon Becker, Essen (DE); Lutz Mindach, Bochum (DE); Holger Kautz, Haltern am See (DE); Miriam Ammer, Recklinghausen (DE)

(73) Assignee: Evonik Degussa GmbH, Essen (DE)

( * ) Notice: Subject to any disclaimer, the term of this patent is extended or adjusted under 35 U.S.C. 154(b) by 371 days.

This patent is subject to a terminal disclaimer.

(21) Appl. No.: 12/830,869

(22) Filed: Jul. 6, 2010

(65) Prior Publication Data

US 2011/0003916 A1 Jan. 6, 2011

(30) Foreign Application Priority Data

Jul. 3, 2009 (DE) .......................... 10 2009 027 446

(51) Int. Cl.
*C09J 151/00* (2006.01)
*C09D 151/00* (2006.01)

(52) U.S. Cl.
USPC ........ 525/242; 525/240; 525/333.7; 525/279; 525/282; 525/298; 525/301; 525/302; 526/348; 526/348.6; 526/351

(58) Field of Classification Search
USPC .............. 525/240, 242, 333.7, 279, 282, 298, 525/301, 302; 526/348, 348.6, 351
See application file for complete search history.

(56) References Cited

U.S. PATENT DOCUMENTS

| 5,677,409 | A | * | 10/1997 | Inoue et al. .................... 526/351 |
| 5,994,474 | A | | 11/1999 | Wey et al. |
| 7,014,886 | B2 | | 3/2006 | Vey et al. |
| 2005/0203255 | A1 | * | 9/2005 | Hanna et al. ................ 525/333.7 |
| 2006/0293424 | A1 | | 12/2006 | Tse et al. |
| 2008/0194765 | A1 | | 8/2008 | Becker et al. |
| 2008/0213515 | A1 | | 9/2008 | Vey et al. |
| 2008/0214757 | A1 | | 9/2008 | Becker et al. |

FOREIGN PATENT DOCUMENTS

| DE | 101 14 345 A1 | 9/2002 |
| EP | 1 614 699 A1 | 1/2006 |
| WO | WO 2009/092752 A2 | 7/2009 |
| WO | WO 2009/092752 A9 | 7/2009 |

OTHER PUBLICATIONS

International Search Report (with English translation of Category of cited Documents) mailed Sep. 1, 2010, in co-pending European Application No. EP 10 16 7292.
U.S. Appl. No. 12/992,792, filed Nov. 15, 2010, Becker, et al.
U.S. Appl. No. 12/990,955, filed Nov. 4, 2010, Becker, et al.
U.S. Appl. No. 12/746,091, filed Jun. 3, 2010, Becker, et al.
U.S. Appl. No. 12/863,716, filed Jul. 20, 2010, Becker, et al.
U.S. Appl. No. 12/830,628, filed Jul. 6, 2010, Becker, et al.
U.S. Appl. No. 12/830,889, filed Jul. 6, 2010, Becker, et al.

\* cited by examiner

*Primary Examiner* — Mark Kaucher
(74) *Attorney, Agent, or Firm* — Oblon, Spivak, McClelland, Maier & Neustadt, L.L.P.

(57) ABSTRACT

The present invention relates to modified polyolefins with atactic structural elements, to processes for preparation thereof and to the use thereof, especially as an adhesive or as a constituent of adhesives.

21 Claims, No Drawings

MODIFIED POLYOLEFINS WITH AN EXCEPTIONAL PROFILE OF PROPERTIES, PROCESS FOR PREPARATION THEREOF AND USE THEREOF

The present invention relates to modified polyolefins with an exceptional profile of properties, the preparation of which is based on semicrystalline polyolefins with atactic structural elements, to a process for preparation thereof and to the use thereof, especially as an adhesive or as a constituent of adhesives.

Amorphous poly-alpha-olefins serve in many cases as adhesive raw materials for a wide range of applications. The field of use extends from the hygiene sector through laminations and packaging adhesives as far as construction adhesives and uses in wood processing. Unmodified amorphous poly-alpha-olefins (known as APAOs) are notable for purely physical curing, which is reversible as desired owing to the thermoplastic character thereof. However, they have only limited tensile strengths and adhesive shear strengths, and a relatively low thermal stability. Moreover, they cannot be used to achieve covalent incorporation of reactive surface groups (for example —OH) into an adhesive bond.

The described disadvantages of unmodified APAOs can be remedied by a subsequent functionalization (modification), for which carboxylic acids or carboxylic acid derivatives and/or silanes in particular can be used for modification.

The preparation of silane-modified polyolefins by reaction of polyethylene with unsaturated silanes has been known for sometime. EP 0004034 gives an early description of a method for crosslinking poly($\alpha$-olefins) with the aid of silane bonds, the intention being to achieve maximum degrees of crosslinking. The crosslinking directly follows the grafting and leads to stiff, high-strength materials with low embrittlement temperature, as used, for example, for the production of cable sheathing and/or mouldings. The polymers described cannot be used as adhesives.

DE 1963571, DE 2353783 and DE 2406844 describe processes for crosslinking polyethylene polymers or ethylene copolymers which contain small amounts of propene and/or 1-butene. The target products are crosslinked mouldings based on polyethylene.

DE 2554525 and DE 2642927 describe processes for producing extruded products, including the silane functionalization of a polymer, the incorporation of a silanol condensation catalyst and the shaping and crosslinking of the polymer, in one operation, by using an extruder. The end applications mentioned are cables, pipes and hoses. Adhesive bonds are not possible with the polymers produced in this way, and further processing overall is possible only to a very limited degree owing to the crosslinking performed immediately after the modification.

It has likewise been known for sometime that it is possible to improve the adhesion of polyolefins to functional surfaces, for example glass, by the introduction of silane groups. For instance, U.S. Pat. No. 3,075,948 gives an early description of graft polymers consisting of unsaturated silane monomers and solid poly(alpha-olefins) having 2-6 carbon atoms, which are said to have improved heat resistance and good adhesion to glass. The resulting modified polymers are used for the production of mouldings and containers, and as a coating for glass vessels; they are not suitable for use as melt-applied adhesives owing to the completely different profile of requirements (melt viscosity, material stiffness in the uncrosslinked state, etc.).

The use of amorphous poly(alpha-olefins) for silane crosslinking is also already known. For example, EP 0260103 describes amorphous silane-modified polymers with a saturated carbon skeleton and low molecular weight, which are used as coating materials for protection from weathering influences. Examples of such polymers include copolymers of ethylene and/or $\alpha$-olefins, especially EPM and EPDM. The base polymers described are amorphous and rubber-like, and have a high elasticity. Owing to their rubber-like character, processability in the uncrosslinked state is poor. The products are unsuitable for the intended applications in the adhesives and sealants sector in the present application.

DE 4000695 describes the use of substantially amorphous poly(alpha-olefins) in a process in which the APAOs are reacted with a free-radical donor and optionally additionally graftable monomers (e.g. vinylsilanes) under simultaneous shear stress. The resulting products are suitable for use as carpet coating materials or as melt-applied adhesives. The substantially amorphous polyolefins used to prepare the modified poly(alpha-olefins), however, themselves (i.e. in the unmodified state) have only poor to moderate material or adhesive properties, in particular only low adhesive shear strengths on untreated isotactic polypropylene and only low tensile strength, such that the modified polymers are also suitable only for applications with low requirements. More particularly, the unmodified, predominantly amorphous polyolefins have a high polydispersity, which leads to disadvantages in material cohesion, and to problems with outgassing low molecular weight constituents. The microstructure of the polymer chains is also not very well-defined, one reason being the heterogeneous polymerization catalysts used to prepare the unmodified polyolefins, and so controlled adjustment to particular material or adhesive requirements is possible only with difficulty. An additional factor is that the modified polymers possess only low functionalization, since the ratio of graft polymerization to chain cleavage is unfavourable. Owing to the low functionalization, the crosslinking reaction proceeds slowly; attachment to reactive surfaces is only relatively weak. An additional factor is that the tensile strength both of the uncrosslinked and of the crosslinked modified polyolefin reaches only relatively low values, as a result of which the products remain excluded from many areas of application.

In JP 2003-002930, graft polymers are prepared from amorphous poly($\alpha$-olefin)s, unsaturated carboxylic acids and optionally additionally unsaturated aromatic substances (e.g. styrene). The polyolefins used are amorphous and do not have a crystallinity of >1 J/g in DSC measurements. Moisture-crosslinking monomer systems, for example vinylsilanes, are not discussed; the grafted polyolefins do not have the desired material parameters owing to the properties of the base polymer thereof and the graft monomers used; more particularly, they are too soft, have only a low heat resistance and exhibit too low a tensile strength.

WO 03/070786 describes a process for preparing modified poly(1-butene) polymers, the modified poly(1-butene) polymers obtainable therefrom, and an adhesive composition comprising the modified poly(1-butene) polymers. The poly (1-butene) base polymer used for the modification has a melting point in the range from 0 to 100° C., an isotacticity index of <20% and a polydispersity of <4.0. The graft monomers mentioned are unsaturated carboxylic acids, carboxylic anhydrides, or corresponding derivatives such as amides, esters, etc.

Moisture-crosslinking monomers, for example vinylsilanes, are not described. The modified polymers prepared are relatively soft and of relatively waxy nature owing to their low crystallinity. The low melting point causes poor heat resistance of the adhesive bonds. The polymers are unsuitable for the applications intended in the present application.

WO 2006/069205 describes modified polyolefins based on low-viscosity polypropylene polymers with a propylene content of >50 mol % and a proportion of isotactic propylene triads of >85%, which can be prepared, among other methods, by a free-radical graft polymerization. Owing to the material properties of the base polymers used, the products obtained are unsuitable for the fields of use intended in the present application.

WO 2007/067243 describes polypropylene polymers functionalized by carboxylic acids and having a high to very high propylene content (75-90 mol %), which are prepared on the basis of propylene-based homo- and/or copolymers with a weight-average molar mass of <100 000 g/mol, a melting point of <157° C. and a melt viscosity at 190° C. of <40 000 cPs at reaction temperatures of 130-165° C. Moisture-crosslinking systems, for example based on silanes, are not described. Owing to the base polymers used and the graft monomers used, the products described are unsuitable for the fields of use intended in the present application.

WO 91/06580 describes silane-modified unsaturated amorphous polymers which can be used in the crosslinked state, for example as mouldings. Further use examples of the silane-modified polymers include adhesive compositions, including melt-applied adhesives. Examples of unsaturated base polymers include rubber-like polymers, for example styrene-butadiene block copolymers (SBS), styrene-isoprene block copolymers (SIS), styrene-butadiene rubber (SBR), nitrile rubber, polychloroprene rubber and butyl rubber. All base polymers mentioned have rubber elasticity (i.e. also poor processability) and/or other adverse material properties (for example poor heat resistances), which make them unsuitable for melt-applied adhesive applications.

The use of silane-modified polymers in hotmelt adhesives is likewise known. For example, WO 89/11513 describes an adhesive composition which contains at least one silane-modified or silane-grafted semicrystalline polymer. The base polymers mentioned are especially homo-, co- and terpolymers of $C_{2-6}$-α-olefins, and also isotactic polypropylene polymers and blends of polypropylenes, especially when they also contain atactic polypropylene. The graft reaction proceeds at temperatures of 140 to 250° C. Atactic polypropylene without defined polymer microstructure intrinsically has a very low softening point [see, for example: H.-G. Elias; Makromoleküle [Macromolecules]; Vol. III; Wiley-VCH: Weinheim; 2001]. The procedure described in WO 89/11513 leads to products with unsatisfactory material properties, especially with regard to cohesion, adhesion (adhesive shear strength) and heat resistance in the uncrosslinked state (for example immediately after application). The adjustment of the viscosity, melting behaviour and tack of the adhesive composition is attributed causally to the use of relatively long-chain silane monomers (≧3 connecting atoms between silicon atom and the polymer chain), which are said to lead to a "more open structure". The use of relatively long-chain silane monomers is disadvantageous in that it leads to weaker crosslinking as a result of a higher degree of polymerization of the network chains (i.e. of the monomeric base units between two crosslinking sites), which additionally has an adverse effect on the material properties of the graft polymer.

DE 19516457 describes a crosslinkable adhesive composition consisting of at least 50% by mass of a silane-grafted polyolefin and additionally of a carboxylic acid-grafted polyolefin. The base polymers specified for the grafting are poly(ethylene-co-vinyl acetate), polypropylene, polyethylene, poly(ethylene-co-methacrylate) and poly(ethylene-co-meth-acrylic acid). Owing to the base polymers used and the graft monomers used, the products described are unsuitable for the desired fields of use.

EP 1508579 describes (silane-)modified crystalline polyolefin waxes with a high propylene content. Owing to their wax-like properties and the resulting poor adhesive properties, the polymers described are unsuitable for the fields of use intended. High functionalization according to the present requirements is not achievable owing to the material properties of the base polymers used.

WO 2007/001694 describes adhesive compositions which contain functionalized polymers (preferably maleic anhydride-grafted propylene polymers). The base polymers used are propylene(co)polymers with high isotactic contents (>75% isotactic triads) and a polydispersity of 1.5 to 40, i.e. predominantly crystalline polymers which possess a very broad molar mass distribution, as normally achievable only in polymers with multimodal distribution. The weight-average molar mass of the polymers used with preference is up to 5 000 000 g/mol, i.e. predominantly in the range of very high molar masses or melt viscosity, which is likewise expressed by the specified limit for the melt index of 0.2 g/10 min. Polymers with a very broad molar mass distribution, especially with a molar mass distribution of >4, however, in free-radically initiated graft reactions, exhibit a very inhomogeneous distribution of functional groups on the polymer chains. More particularly, the grafted polymers contain very high proportions of short chains without a functional group or with only one or a maximum of two functional groups, which either do not enable any reactive connection at all (no functional group), or else are not capable of forming three-dimensional networks. This in turn leads both to poor adhesion and to relatively poor cohesion. Polymers with very high molar masses and very high melt viscosity are additionally difficult to process especially in melt processes, and, owing to the great viscosity difference, have a poor miscibility with monomers and free-radical initiators, which leads to inhomogeneous products with a poor profile of properties.

WO 2007/002177 describes adhesive compositions based on poly(propylene) random copolymers, functionalized polyolefin copolymers which are rich in syndiotactic units, and non-functionalized adhesive resins, the poly(propylene) random copolymers having an enthalpy of fusion of 0.5 to 70 J/g and a proportion of isotactic propylene triads of at least 75% (more preferably >90%), and the functionalized (syndiotactic) polymers used having a content of functional monomer units of at least 0.1% and being present with a proportion of <5% by mass in the adhesive composition. The poly(propylene) random copolymers described have a polydispersity of 1.5 to 40, which indicates a multimodal molar mass distribution and the simultaneous presence of a plurality of catalyst species. The specified melting range of 25 to 105° C., which has several melting peaks of different intensity, points in the same direction, the specified limit of 105° C. having a low value unusual for polypropylene polymers, especially for isotactic polypropylene polymers. Polymers with a very broad molar mass distribution, especially with a molar mass distribution of >5, exhibit a very inhomogeneous distribution of functional groups on the polymer chains in free-radically initiated graft reactions. More particularly, the grafted polymers contain very high proportions of short chains with no functional group or with only one or a maximum of two functional groups, which either do not enable any reactive connection at all (no functional group), or else are not capable of forming three-dimensional networks. This in turns leads both to poor adhesion and to relatively poor cohesion. The specified upper limit for the melting range ensures a low thermal stability of the corresponding bonds.

WO 2007008765 describes the use of low-viscosity silane-grafted poly(ethylene-co-1-olefin) polymers as an adhesive raw material. The polymers used for modification have an ethylene content of at least 50 mol % of ethylene. The 1-olefin comonomers include numerous higher 1-olefins, for example 1-hexene and 1-octene, but also some branched 1-olefins, for example 3-methyl-1-pentene and various other monomers, for example dienes, styrene, etc., which do not meet the above "1-olefin" requirement, and therefore lead to polymers with completely different material properties. Diene polymers in particular tend to crosslinking and formation of gel particles when used in peroxidic processes. This tendency is enhanced by the inventive presence of vinyl end groups in the base polymers. The silane-grafted polymers have very low failure temperatures of only >43° C. (PAFT) and >60° C. (SAFT). The use of polyolefins with a high ethylene content inevitably means the presence of long ethylene blocks in the polymer. This in turn leads to poor wetting and adhesive properties on many plastics surfaces, such that very many adhesion problems cannot be solved in an optimal manner. In addition, long polyethylene sequences tend to peroxidic crosslinking (which is exploited industrially in the production of cable sheathing among other applications), as a result of which gel formation is unavoidable. The ungrafted base polymers have a relatively low molar mass and melt viscosity of not more than 50 000 cP at 177° C. The molar mass (and hence also the melt viscosity) is known to be degraded by chain cleavage in a peroxidically induced graft reaction. Corresponding polymers with high functionalization rates therefore inevitably have very low molar masses/melt viscosities, and are unsuitable for many application sectors. The use of relatively low molecular weight base polymers generally leads to rather low functionalization rates. Likewise described are resin compositions which already contain crosslinked poly(ethylene-co-1-olefin) polymers. Compositions containing such rubber-like constituents are unsuitable for visually demanding applications (poor surface structure) and also cannot be processed on many application systems customary in the adhesives sector (for example melt spraying) (blockage of the application nozzles). The melt-applied adhesives described as the application have principally low melt viscosities. Likewise described is the use of crystalline and semi-crystalline poly(propylene-co-1-olefin) polymers which are likewise said to be suitable for grafting. These have a propylene content of at least 50 mol % and preferably likewise a melt viscosity of not more than 50 000 cP at 177° C. (before grafting and after grafting), and a polydispersity of 1 to 5. Examples of poly(propylene-co-1-olefin) polymers include polymers of the VISTAMAXX, LICOCENE, Eastoflex, REXTAC and VESTOPLAST product series. Semi-crystalline polyolefin polymers with a specific microstructure are not described. The crystallinity of the poly(propylene-co-1-olefin) copolymers is reported as 2-60% (i.e. 3-100 J/g), and is thus essentially in the range of high crystallinity. This in turn causes poor wetting of and/or poor adhesion to polyolefin surfaces, and rules out numerous fields of application.

EP0827994 describes the use of silane-grafted amorphous poly(alpha-olefins) as a moisture-crosslinking adhesive raw material or adhesive. The base polymers used are atactic polypropylene (aPP), atactic poly(1-butene), or preferably co- or terpolymers formed from $C_4$-$C_{10}$ alpha-olefins (0-95% by mass), propene (5-100% by mass) and ethylene (0-20% by mass). The silane-modified APAO described in the examples has a softening point of 98° C., a needle penetration of 15*0.1 mm and a melt viscosity of 6000 mPa*s. The atactic polyolefins and APAOs used have a relatively low molar mass and a relatively low crystallinity, which leads on modification to products with low flexibility, which possess a low functionality and a low tensile strength, and are therefore unsuitable for many applications.

The use of metallocene compounds as a catalyst in olefin polymerization has likewise been known for some time. Kaminsky et al. have shown that the cyclopentadienylzirconium dichloride/methylaluminoxane ($Cp_2ZrCl_2$/MAO) catalyst system is very suitable for polymerization (*Adv. Organomet. Chem.* 1980, 18, 99-149). Since this time, the use of metallocene compounds in conjunction with methylaluminoxane (MAO) has become widespread in polymerization reactions. For instance, there is a multitude of publications concerned with metallocene-catalysed olefin polymerization, for example of propene, for example U.S. Pat. No. 6,121,377, EP 584 609, EP 516 018, WO 2000/037514, WO 2001/46274 and US 2004/0110910.

In the polymerization of propene or higher homologues thereof, different relative stereoisomers may be formed. The regularity with which the configurative repeat units follow one another in the main chain of a macromolecule is referred to as tacticity. To determine the tacticity, the monomer units of a polymer chain are considered and the relative configuration of each (pseudo)asymmetric chain atom relative to the preceding atom is determined. Isotacticity refers to the situation where the relative configuration of all (pseudo)asymmetric chain atoms found is always the same, i.e. the chain is formed from only one single configurative repeat unit. Syndiotacticity, in contrast, refers to the situation where the relative configurations of successive (pseudo)asymmetric chain atoms are the opposite of one another, i.e. the chain is formed from two different alternating configurative repeat units. In atactic polymers, finally, the different configurative repeat units are arranged randomly along the chain.

The physical properties of propylene polymers depend primarily on the structure of the macromolecules and hence also on the crystallinity, the molecular weight thereof and the molecular weight distribution, and can be influenced by the polymerization process used and especially the polymerization catalyst used [R. Vieweg, A. Schley, A. Schwarz (eds.); Kunststoff Handbuch [Plastics Handbook]; vol. IV/"Polyolefine" [Polyolefins]; C. Hanser Verlag, Munich 1969].

Polypropylene polymers are thus divided into atactic, isotactic and syndiotactic polymers on the basis of their tacticity. Additional special forms include the so-called hemiisotactic polypropylene polymers and the so-called stereoblock polymers. The latter are usually polymers with isotactic and atactic stereoblocks which behave like thermoplastic elastomers, since a physical crosslinking of the polymer chains takes place, which leads to a connection of different crystalline polymer regions (A. F. Mason, G. W. Coates in: "Macromolecular Engineering"; Wiley-VCH, Weinheim; 2007).

Atactic polypropylene has a low softening point, a low density and a good solubility in organic solvents. Conventional atactic polypropylene (aPP) features a very wide molecular weight distribution, which firstly leads to a broad melting range, and secondly entails high low molecular weight fractions which have a greater or lesser tendency to migrate. aPP has a very low tensile strength of approx. 1 MPa, but on the other hand has a very high elongation at break of up to 2000% (H.-G. Elias; Makromoleküle; vol. III; Wiley-VCH; Weinheim; 2001). Owing to the low softening point, the thermal stability of aPP formulations is correspondingly low, which leads to a significant limitation in the area of use. Purely atactic polypropylene polymers can also be prepared by metallocene catalysis to obtain either very low molecular weight or relatively high molecular weight polymers (L. Resconi in: "Metallocene based Polyolefins"; J. Scheirs, W. Kaminsky (eds.); J. Wiley & Sons; Weinheim; 1999).

Syndiotactic polypropylene is highly transparent and is notable for good thermal stability, the melting temperature being below that of isotactic polypropylene. It has high fracture resistances coupled with moderate elongation at break (A. F. Mason, G. W. Coates in "Macromolecular Engineering"; Wiley-VCH, Weinheim; 2007). A disadvantage is the slow crystallization from the melt which is observed in many cases. Owing to physical loops, the melt viscosity of syndiotactic polypropylene with comparable molar mass is significantly higher than that of isotactic polypropylene, i.e. it is possible to achieve the same melt viscosity with significantly lower molar masses. Syndiotactic and isotactic polypropylene are immiscible from a certain molar mass; corresponding polymer blends tend to phase separation. Polymer blends of syndiotactic polypropylene with other polyolefins exhibit a significantly higher elongation at break than blends comprising isotactic polypropylene (T. Shiomura, N. Uchikawa, T. Asanuma, R. Sugimoto, I. Fujio, S. Kimura, S. Harima, M. Akiyama, M. Kohno, N. Inoue in: "Metallocene based Polyolefins"; J. Scheirs, W. Kaminsky (eds.); J. Wiley & Sons; Weinheim; 1999). Conventional heterogeneous Ziegler-Natta catalysts are incapable of preparing syndiotactic polypropylene.

Isotactic polypropylene features a high melting temperature and good tensile strength. For 100% isotactic polypropylene, the calculated melting temperature is 185° C. and the melting enthalpy is approx. 207 J/g (J. Bicerano; J. M. S.; Rev. Macromol. Chem. Phys.; C38 (1998); 391ff). As a homopolymer, however, it has a relatively low cold stability and a high brittleness, and a poor heatsealability or weldability. The tensile strength (fracture) is approx. 30 MPa, and virtually no elongation at break occurs. Improved material properties can be established by co- or terpolymerization with ethylene and 1-butene, the comonomer content for copolymers with ethylene being typically <8% by mass and, for terpolymers with ethylene and 1-butene, <12% by mass (H.-G. Elias; Makromoleküle; vol. III; Wiley-VCH; Weinheim; 2001). At the same MFR (melt flow rate), isotactic polypropylene which has been prepared by conventional heterogeneous Ziegler-Natta catalysis has a significantly lower intrinsic viscosity than polypropylene which has been prepared by metallocene catalysis. The impact resistance of the metallocene-based polymer is above that of the Ziegler-Natta material within a wide molar mass range. (W. Spaleck in: "Metallocene based Polyolefins"; J. Scheirs, W. Kaminsky (eds.); J. Wiley & Sons; Weinheim; 1999).

Since the solubility of polypropylene depends both on the molecular weight and on its crystallinity, a corresponding fractionation can be effected by means of dissolution tests [A. Lehtinen; Macromol. Chem. Phys.; 195 (1994); 1539ff]. With regard to the solubility of polypropylene polymers in aromatic solvents and/or ethers, there are numerous publications in the scientific literature. For example, it has been found that the proportion of xylene-soluble constituents is significantly <1% by mass for isotactic poly(propylene) homopolymer which has been obtained by metallocene catalysis; in the case of random copolymers with ethylene, according to the ethylene content, xylene-soluble fractions of not more than 5% by mass are found (W. Spaleck in: "Metallocene based Polyolefins"; J. Scheirs, W. Kaminsky (eds.); J. Wiley & Sons; Weinheim; 1999).

It has been known for some time that it is possible by means of extraction with ethers to obtain amorphous atactic fractions [J. Boor; "Ziegler-Natta Catalysts and Polymerization"; Academic Press; New York; 1979] and low molecular weight fractions with low crystallinity [G. Natta, I. Pasquon, A. Zambelli, G. Gatti; Makromol. Chem.; 70 (1964); 191ff] from polypropylene polymers. Highly crystalline isotactic polymers, in contrast, have a very low solubility both in aliphatic solvents and in ethers, specifically also at elevated temperature [B. A. Krentsel, Y. V. Kissin, V. I. Kleiner, L. L. Stotskaya; "Polymers and Copolymers of higher 1-Olefins"; p. 19/20; Hanser Publ.; Munich; 1997]. The soluble polymer fractions generally have only a very low crystallinity, if any, and do not exhibit a melting point [Y. V. Kissin; "Isospecific polymerization of olefins"; Springer Verlag; New York; 1985]. Tetrahydrofuran-soluble polypropylene oligomers have very low number-average molar masses of significantly less than 1500 g/mol [H. El Mansouri, N. Yagoubi, D. Scholler, A. Feigenbaum, D. Ferrier; J. Appl. Polym. Sci.; 71 (1999); 371ff].

The different polymer types differ significantly in their material properties. The crystallinity of highly isotactic or syndiotactic polymers is very high owing to their high order. Atactic polymers, in contrast, have a higher amorphous content and accordingly a lower crystallinity. Polymers with high crystallinity exhibit many material properties which are undesired especially in the field of hotmelt adhesives. For example, a high crystallinity in low molecular weight polymers leads to very rapid crystallization with open times ("open time"=time interval within which the parts to be adhesive bonded can be bonded to one another) of in some cases less than one second. In the case of application (for example in the case of nozzle application by spraying), this leads to blockage of the application equipment used even in the event of very small temperature variations, and hence to very poor process stability. An additional factor is the exceptionally short time interval within which the adhesive bond can be joined after the application. Highly crystalline polymers at room temperature are additionally hard and brittle and have only a very low flexibility, which is likewise undesired in the case of adhesive bonds. An additional factor is that very high amounts of energy are required for the melting of highly crystalline polymers at individual points (at the site of introduction) and over the entire conduit system, which, as well as economic effects, also has adverse effects for processability. Furthermore, in the case of highly crystalline polymers, there is spontaneous (immediate) solidification below the melting point (which, in analysis by means of differential calorimetry (DSC), is characterized by a sharp melting peak in the 2nd heating), which makes impossible or greatly complicates the processability of such polymers or of the products produced on the basis of such polymers.

The preparation of poly-1-olefins with isotactic propylene segments by use of metallocene catalysts is known.

For example, EP0384264 describes substituted and unsubstituted bisindenylzirconocenes with highly varying bridging elements for the preparation of polypropylene waxes with a propylene content of 80 to 99.75% by mass. Owing to their high crystallinity, their hardness and the poor adhesive performance in formulations, the isotactic crystalline waxes described are unsuitable for the uses intended in the present application. Modification using free-radical graft polymerization leads, owing to the unfavourable chain topology, to very significant polymer degradation with simultaneously low graft rates.

EP480390 describes a process for preparing polyolefins with high tacticity and high molar mass, in which the selection of a specifically adjusted system composed of metallocene catalyst and cocatalyst allows the use of aromatic solvents to be dispensed with. According to the examples, both isotactic and syndiotactic polymers are obtained, the isotacticity index of which is in the range from 90 to 99%, and the syndiotacticity index of which is 96%. Polymers with high proportions of atactic triads and polymers with a specific ratio of syndiotactic to isotactic and atactic structural elements are not described. Modification of the polymers described using free-radical graft polymerization likewise leads, owing to the unfavourable chain topology, to very significant polymer degradation at simultaneously low graft rates.

EP584609 describes rac/meso mixtures of substituted and unsubstituted bisindenylzirconocenes, with which it is possible to prepare mixtures of atactic and isotactic polyolefins. Meso forms of metallocene catalysts are known to prepare polymers with irregular undefined stereo structure, with simultaneously very low catalyst activities and poor reproducibility of the polymerization results. The use of such products in a free-radical graft polymerization leads to materials with poor material properties, especially in respect of material cohesion.

EP 1263815 discloses substantially amorphous polymers based on poly(1-olefin) copolymers, which, owing to their rheological behaviour, are said to be suitable as adhesives, and a process for preparation thereof. As has long been known, amorphous polymers, however, have very unbalanced material behaviour. More particularly, the cohesion of such polymers is distinctly underdeveloped in relation to adhesion, and there is therefore frequently cohesive failure of adhesion in the corresponding adhesive bonds. The polymers described are used especially as or in pressure-sensitive adhesive(s) (PSAs). For conventional adhesive bonds, the profile of properties thereof is, however, very disadvantageous. What are claimed are co- and terpolymers, preferably based on propylene. Poly(1-butene) homopolymer and copolymers based on 1-butene with the comonomers propylene (propylene content <60 mol %) or ethylene, which have a 1-butene content of >40 mol %, are not described. Nor are poly(ethylene-co-propylene) copolymers or terpolymers with specific properties.

WO 01/46278 describes 1-olefin copolymers with predominantly amorphous character, which are obtained by metallocene catalysis. The use thereof as melt-applied adhesive is said to require only minimal additions of adhesive resins, if any. The copolymers consist of A: 60 to 94% of a $C_3$-$C_6$ 1-olefin, B: 6-40 mol % of one or more $C_4$-$C_{10}$ 1-olefins and optionally C: 0-10 mol % of another unsaturated monomer (preferably ethylene). The random distribution of the comonomer B disrupts the crystallinity of the polymers to a particularly high degree, since only few regions attain the minimum block length needed for crystallization (see, for example, S. Davison, G. L. Taylor; Br. Polym. J.; 4 (1972); 65ff). This is evident, inter alia, from the low melting point of the polymers described. Substantially amorphous polymers additionally have very unbalanced material behaviour. More particularly, the cohesion of such polymers is distinctly underdeveloped in relation to adhesion, and there is therefore frequently a cohesive failure of adhesion in the corresponding adhesive bonds. Such polymers with a low melting point also lead to poor heat resistance in bonds, which rules out numerous fields of use. Comonomers with more than 4 carbon atoms are additionally very expensive, which makes the products uneconomic with regard to their fields of use and the product prices to be achieved there. Freedom from aromatics is difficult to guarantee via the preparation process described, especially since preference is given to polymerizing in aromatic solvents, and the cocatalyst used does not dissolve in aliphatic solvents. The high reaction temperatures, which are above (in some cases very far above) the melting points of the polymers prepared, lead to very high reaction pressures which make it difficult to operate the polymerization process economically. An additional factor is that many inventive monomers are in the supercritical state in large parts of the process window specified ($T_R$ 40-250° C., $p_R$ 10-3000 bar), which requires a high level of technical complexity to control the process, and further limits the economic viability of the process.

Walter et al. describe the preparation of "new" polypropylene copolymers using metallocene catalysts. This uses metallocene catalysts which generate isotactic polymers. It is found that benzoindenyl systems with 2-methyl substitution are suitable in particular for modern propylene gas phase polymerization processes [Walter, Philipp; Mader, Dietmar; Reichert, Peter; Mulhaupt, Rolf; Journal of Macromolecular Science, Pure and Applied Chemistry (1999), A36(11), 1613-1639].

JP 2004-196848 describes low crystallinity 1-butene block copolymer with 0.5-50 mol % of ethylene or propylene components, which are obtainable via polymerization with double-bridged metallocene catalysts. Owing to their low crystallinity and their low melting point, the polymers described do not meet the prerequisites for use as adhesive raw materials, since the formulations obtainable therefrom have too low a heat resistance.

US 2004/0110910 describes a process for preparing branched, high-crystallinity polypropylene polymers with a low ethylene content (0-2% by mass) and an enthalpy of fusion of >70 J/g, which are said to be suitable, inter alia, for use in adhesives, for example. For the preparation, bisindenylzirconocenes in particular are used, especially those with phenyl substituents on the indenyl system. Owing to their high crystallinity, the polymers mentioned are predominantly hard and inflexible, which is counterproductive for the uses intended in the present application. The additional presence of branches influences the melting and setting behaviour in a likewise highly adverse manner.

Highly isotactic or syndiotactic polypropylene homo- or copolymers with ethylene and/or higher olefins, as described in the publications cited, are unsuitable for use as a melt-applied adhesive or adhesive raw material.

There was therefore a need for functionalized (semicrystalline) polyolefins with improved material properties, especially in functionalized polyolefins which are prepared on the basis of unfunctionalized polyolefins with a defined polymer structure, which enable a high degree of functionalization with simultaneously moderate polymer degradation owing to their defined chain structure in the free-radical functionalization. At the same time, the functionalized polyolefins should additionally exhibit strongly adhesive material behaviour coupled with good cohesive properties, without having the disadvantages of completely amorphous polymer systems. It has been found that, surprisingly, the functionalized polyolefins according to the present invention fulfil this complex profile of requirements, and more particularly are suitable for use in or as an adhesive.

The present invention accordingly firstly provides modified polyolefins based on unfunctionalized polyolefins which contain not more than 30% by mass of ethylene, either 70-98% by mass or not more than 30% by mass of propylene and/or either 70-100% by mass or not more than 25% by mass of 1-butene, where the sum of the proportions is 100% by mass, the triad distribution determined by $^{13}C$ NMR for propene triads (in the case that the polymers contain propene triads) having an atactic content of 20-55% by mass, a syndiotactic content of not more than 30% by mass and an isotactic content of 40-80% by mass, and/or the triad distribution determined by $^{13}$C NMR for 1-butene triads (in the case that the inventive polymers contain 1-butene triads) has an atactic content of 2-85% by mass and a syndiotactic content of not more than 20% by mass, where the contents of isotactic, syndiotactic and atactic triads of propene and 1-butene each add up to 100%, the unfunctionalized polymers having been prepared using a metallocene catalyst, and monomers having one or more functional groups having been grafted onto the unfunctionalized polyolefins, preferably by means of free-radical graft polymerization. The functionalized polyolefins are used especially as and/or in adhesives.

There are generally significant differences between polyolefins prepared on the basis of Ziegler-Natta catalysts (for example supported or unsupported TiCl$_3$*AlCl$_3$ catalysts) and those prepared on the basis of metallocene catalysts. One effect of this is that the unmodified polyolefins used in accordance with the invention cannot be obtained by conventional Ziegler-Natta catalysts. The main differences are the molecular and chemical homogeneity of the (co)polymers, which is significantly less in the case of Ziegler-Natta polyolefins than in the case of metallocene-based polyolefins owing to the heterogeneous catalyst structure ("multi-site" catalysts). More particularly, polydispersities of <3 and the simultaneous random distribution of comonomers (especially of those with high reactivity, for example ethylene) over the polymer chain cannot be achieved by Ziegler-Natta catalysts. As a result, the proportions of low molecular weight species in the case of Ziegler-Natta polyolefins are generally significantly higher than in the case of metallocene polyolefins.

The inventive functionalized polyolefins have the particular advantage that they have both good adhesion to most common materials, and also good material cohesion, owing to their defined polymer chain structure, the defined polymer chain structure of the inventive polymers, even without taking account of the (additional) effects caused by the monomers grafted on, brings about especially good surface wetting, and hence good adhesion on a substrate used for adhesive bonding. Owing to the atactic structural elements (e.g. comonomer blocks) present in the inventive unmodified polymer, the chain cleavage (β-scission) which occurs in the case of free-radical polymer modifications is particularly suppressed, such that a high degree of functionalization is achieved with simultaneously high molar masses, which leads, for example, to functionalized polyolefins with high reactivity coupled with simultaneously high melt viscosity. Especially advantageous is the use of the inventive functionalized polyolefins in adhesives, especially in melt-applied adhesives, the physical properties of which are shaped in this way essentially by the advantageous material properties of the inventive functionalized polyolefins.

More particularly, the inventive functionalized polymers are obtainable using the inventive unfunctionalized polymers by processes as described hereinafter in the present invention. The use of the processes according to the invention to prepare the inventive functionalized polymers is especially preferred and enables simple access to the desired functionalized polymers.

Essential features for the positive properties of the inventive functionalized polyolefins is/are the specific microstructure of the polymer chains used for functionalization, the polymer composition thereof and/or the specific (macroscopic) material properties of the base polymer used.

In the unfunctionalized polyolefins used to prepare the inventive functionalized polymers, the triad distribution determined by $^{13}$C NMR for propene triads (provided that the polymer contains propene triads) has an atactic content of 20-55% by mass, preferably of 21-53% by mass, more preferably of 22-51% by mass and especially of 23-50% by mass, based on the propene triads. This achieves the effect that both the inventive unfunctionalized polymers and the functionalized polymers prepared therefrom, on application to a surface (for example a substrate to be bonded), but especially to olefin homo- and copolymers, lead to optimal wetting of this surface, which brings about very good adhesion and, alone or in formulations, possess a high flexibility, especially a high extensibility. In addition, by a restriction in the chain cleavage ("β-scission"=side reaction) which proceeds in parallel to the grafting, high degrees of grafting are achieved in the free-radical functionalization.

Likewise preferably, the triad distribution determined by $^{13}$C NMR for propene triads in the unfunctionalized polyolefins used to prepare the inventive functionalized polymers (provided that the polymer contains propene triads) has an isotactic content of 40-80% by mass, preferably of 42-78% by mass, more preferably of 44-76% by mass and especially of 45-75% by mass, based on the propene triads. This achieves the effect that both the inventive unfunctionalized polymers and the functionalized polymers prepared therefrom, in addition to the dominant adhesive material properties, have increased cohesion and high heat resistance.

In addition, the triad distribution determined by $^{13}$C NMR for propene triads in the unfunctionalized polyolefins used to prepare the inventive functionalized polymers (provided that the polymer contains propene triads) has a syndiotactic content of not more than 30% by mass, preferably of 1-27% by mass, more preferably of 3-25% by mass and especially of 5-23% by mass, based on the propene triads. This achieves the effect that both the inventive unfunctionalized polymers and the functionalized polymers prepared therefrom, in addition to the adhesive and cohesive material properties, possess a high elasticity, and exhibit optimal levelling when the melt is applied. An additional factor is improved transparency, which is desired especially in the field of film bonding.

Especially preferably, the triad distribution determined by $^{13}$C NMR for 1-butene triads in the unfunctionalized polyolefins used to prepare the inventive functionalized polymers (provided that the polymer contains 1-butene triads) has an isotactic content of 20-98% by mass, preferably of 22-96% by mass, more preferably of 24-94% by mass and especially of 25-92% by mass, based on the 1-butene triads. This achieves the effect that both the inventive unfunctionalized polymers and the functionalized polymers prepared therefrom have optimally balanced setting behaviour. Compared to isotactic propylene units, the isotactic 1-butene units crystallize more slowly. The inventive isotactic content guarantees an optimal initial strength. As a result of the retarded phase conversion of tetragonal phase II crystals to hexagonal phase I crystals, the polymers exhibit, after cooling from the melt, a high flexibility over a relatively long period.

Especially preferably, the triad distribution determined by $^{13}$C NMR for 1-butene triads (provided that the polymer contains 1-butene triads) has a syndiotactic content of not more than 20% by mass, preferably of not more than 18% by mass, more preferably of not more than 16% by mass and especially of 1-15% by mass, based on the 1-butene triads.

This achieves the effect that both the inventive unfunctionalized polymers and the functionalized polymers prepared therefrom possess a high elasticity and exhibit optimal levelling when the melt is applied. An additional factor is an improved transparency, which is desired especially in the field of film bonding.

In addition, the triad distribution determined by $^{13}$C NMR for 1-butene triads in the unfunctionalized polyolefins used to prepare the inventive functionalized polymers (provided that the polymer contains 1-butene triads) has an atactic content of not more than 85% by mass, preferably of 2-80% by mass, more preferably of 4-75% by mass and especially of 5-70% by mass, based on the 1-butene triads. This achieves the effect that the inventive polymers have an optimal degree of adhesion to all relevant substrates, but especially to olefin homo- and copolymers, and, alone or in formulations, possess a high flexibility, especially a high extensibility.

Additionally preferably, the triad distribution determined by $^{13}$C NMR, in the case of the unfunctionalized polyolefins used to prepare the inventive functionalized polymers, in the case that they are poly(ethylene-co-propylene-co-1-butene) terpolymers, for ethylene contents up to 30% by mass, have a proportion of ethylene triads of 0.1-10% by mass, preferably 0.25-7.5% by mass, more preferably 0.3-7% by mass, especially preferably 0.4-6.8% by mass, based on the ethylene content, such that the ethylene monomer is thus incorporated either substantially in random distribution over the polymer chain, or in the form of blocks. This achieves the effect that crystallinity and material behaviour can be controlled for the inventive unfunctionalized and functionalized polymers. In the case of a random distribution over the polymer chain, there is significant disruption of crystallinity, since the block length of the different monomer units is frequently below the minimum necessary for crystallization. In the case of block-type combination with isotactic propylene units, the result is "hard-soft" block formation, since the ethylene blocks, in contrast to the propylene blocks, do not reach the minimum block length necessary for "intrinsic" crystallization. However, the ethylene blocks are never so long that crosslinking (characterized, for example, by a significant rise in melt viscosity) takes place in a free-radical graft polymerization.

The unfunctionalized polyolefins used to prepare the inventive functionalized polymers contain preferably not more than 30% by mass, preferably not more than 25% by mass and more preferably not more than 23% by mass and most preferably not more than 20% by mass of ethylene.

In a preferred embodiment of the present invention, the unfunctionalized polyolefins used to prepare the inventive functionalized polymers contain 100% by mass of 1-butene.

In a further preferred embodiment of the present invention, the unmodified polymers used in accordance with the invention for modification are copolymers of ethylene, propylene and/or 1-butene, where the copolymers contain not more than 30% by mass, preferably not more than 25% by mass and more preferably not more than 22% by mass and most preferably not more than 20% by mass of ethylene. For the propylene or butene content, there are several alternative possibilities. Either the propylene content is 70-98% by mass, preferably in the range of 72-95% by mass, or the propylene content is not more than 30% by mass, preferably in the range of 1-27% by mass and more preferably in the range of 2-25% by mass. The butene content is either 70-100% by mass, preferably in the range of 75-95% by mass, or not more than 25% by mass, preferably in the range of 1-23% by mass and more preferably in the range of 2-20% by mass. In total, the content of all comonomers mentioned must add up to 100% by mass, i.e. the inventive polymers are either relatively propylene- or butene-rich, and the monomers mentioned may be combined with one another as desired, i.e. propylene with butene and/or ethylene.

More particularly, the unfunctionalized polymers used to prepare the inventive functionalized polymers are poly(ethylene-co-propylene) copolymers with an ethylene content of not more than 30% by mass, poly(ethylene-co-1-butene) copolymers with an ethylene content of not more than 30% by mass, poly(propylene-co-1-butene) copolymers with a propylene content of not more than 30% by mass or poly(propylene-co-1-butene) copolymers with a 1-butene content of not more than 25% by mass.

In a particular embodiment of the present invention, the unfunctionalized polymers used to prepare the inventive functionalized polymers contain propylene, 1-butene and/or ethylene, and a branched olefin selected from the group comprising 3-methyl-1-butene, 4-methyl-1-pentene, 3-methyl-1-hexene, 6-methyl-1-hexene, 3-methyl-1-heptene, where the content of the branched 1-olefin in the copolymer is not more than 50% by mass, preferably not more than 40% by mass and more preferably not more than 30% by mass.

For the likewise preferred case of a terpolymer, the unfunctionalized terpolymers used to prepare the inventive functionalized polymers contain especially ethylene, propylene and 1-butene, where one of the three comonomers has a content of at least 70% by mass, while the two other monomers together form a content of not more than 30% by mass. The terpolymers contain a content of not more than 28% by mass, preferably not more than 25% by mass and more preferably not more than 23% by mass of ethylene.

The following sub-combinations are especially preferred for the above-mentioned copolymers and terpolymers: poly(ethylene-co-propylene), poly(ethylene-co-1-butene), poly(propylene-co-1-butene), poly(propylene-co-3-methyl-1-butene), poly(1-butene-co-3-methyl-1-butene), poly(propylene-co-3-methyl-1-hexene), poly(propylene-c-3-methyl-1-heptene), poly(ethylene-co-propylene-co-1-butene) and poly(ethylene-co-propylene-co-3-methyl-1-butene).

The unfunctionalized polymers used to prepare the inventive functionalized polymers are preferably in the form of a powder, in the form of pellets or in the form of granules. Direct further processing of molten unfunctionalized polymers to give the inventive functionalized polymers is likewise possible.

The inventive unfunctionalized polymers contain preferably no aromatic compounds originating from the polymerization process (i.e. <100 µg/g). Furthermore, they additionally contain essentially no organic halogenated compounds which originate from the polymerization process. It is likewise preferred that the polymers contain no impurities as a result of suspension oils (separating agents), no residuals of inorganic support materials, more particularly no inorganic oxides and/or alkaline earth metal halides (for example $MgCl_2$), no inorganic or organic boron compounds, no talcites and/or hydrotalcites and/or degradation products thereof, and no contamination by alcohols, more particularly by methanol.

The molar mass distribution of the unfunctionalized polymers used to prepare the inventive functionalized polymers may be monomodal or bimodal, the molar mass distribution is especially preferably monomodal.

Polymers with a monomodal molar mass distribution are notable (especially in the case of low polydispersity) for a low variance in the material properties. For example, monomodally distributed polyolefins have clearly defined melting and setting behaviour. In the case of a very narrow molar mass distribution, defined melting/setting behaviour can also be achieved with bimodally distributed polymers, especially when relatively long open times are required and/or no sharp melting peaks must occur (for example in the case of long joining times or varying application temperature).

In addition, the unfutionalized polymers used to prepare the inventive functionalized polymers have a polydispersity, determined by high-temperature gel permeation chromatography with universal calibration, of 1.3-4, preferably of 1.4-3.5, more preferably of 1.4-3.0, especially of 1.4-2.9 and most preferably of 1.5-2.7. This range is particularly advantageous, especially for use in the adhesives sector. Crystallization or melting behaviour in polymers, especially in polyolefins, is known to be a function of molar mass, and in the case of linear polyolefins more particularly of chain length. For example, it is known from conventional amorphous polyolefins as currently being used in the field of hot-melt adhesives that a polydispersity of 4-6 (or even higher) leads firstly to a very broad melting range and secondly to retarded physical curing/crystallization. An additional disadvantage of the known systems is that polymers with broad molar mass distribution, owing to the crystallization deficiencies described, frequently also exhibit poor tensile strengths, which is likewise undesired. Generally, a broad molar mass distribution is a sign that not a homogeneous polymer but instead a polymer mixture (or a polymer blend) is present, which is known to lead to restrictions in the material properties.

The weight-average molar mass of the unfunctionalized polymers used to prepare the inventive functionalized polymers, determined by high-temperature gel permeation chromatography with universal calibration, is typically in the range from 10 000 to 150 000 g/mol, preferably of 12 000 to 130 000 g/mol, more preferably in the range from 14 000 to 120 000 g/mol and especially preferably in the range from 15 000 to 110 000 g/mol, further preferred ranges being from 15 000 to 45 000 g/mol, from 30 000 to 75 000 g/mol and from 60 000 to 105 000 g/mol. This range is particularly advantageous for use in free-radical graft processes, since, including chain cleavage (which is obligatory in most cases), during the graft reaction, polymers with molar masses are obtained, which ensure good base cohesion. The inventive modified polymers thus possess an optimal melt viscosity within the relevant application window, such that there is optimal wetting of the surface to be bonded. The relatively low melt viscosity within the preferred molar mass range also enables penetration into macroscopic and microscopic surface structures.

In addition, the unfunctionalized polymers used to prepare the inventive functionalized polymers are notable in that they have an ALPHA value, determined by high-temperature gel permeation chromatography with universal calibration, in the range from 0.5 to 1.2, preferably in the range from 0.55 to 1.15, more preferably in the range from 0.58 to 1.1 and especially preferably in the range from 0.6 to 1.05. The inventive unmodified polymers are thus notable for low branching; more particularly, they preferably do not contain any long-chain branches. Owing to their molecular structure, branched polymers exhibit highly complex rheological behaviour, which leads to poor processability. An additional factor is that highly branched polyolefins (especially those with a high ethylene content) tend to peroxidic crosslinking, which is undesired for obvious reasons in the present case.

In a particularly preferred embodiment, the ALPHA value determined by a high-temperature gel permeation chromatography with universal calibration for the unfunctionalized polymers used to prepare the inventive functionalized polymers is in the range from 0.55 to 0.80, preferably in the range from 0.57 to 0.79 and especially preferably in the range from 0.58 to 0.78, while the polydispersity of the inventive unfunctionalized polymers, likewise determined by high-temperature gel permeation chromatography with universal calibration, is in the range from 2.0 to 3.5, preferably in the range from 2.1 to 3.4, more preferably in the range from 2.2 to 3.3 and especially preferably in the range from 2.3 to 3.2.

In a further particularly preferred embodiment, the ALPHA value determined by high-temperature gel permeation chromatography with universal calibration for the unfunctionalized polymers used to prepare the inventive functionalized polymers is in the range from 0.7 to 1.1, preferably in the range from 0.75 to 1.08, more preferably in the range from 0.8 to 1.06 and especially preferably in the range from 0.82 to 1.05, while the polydispersity of the inventive unfunctionalized polymers, likewise determined by high-temperature gel permeation chromatography with universal calibration, is not more than 3, preferably not more than 2.5, more preferably not more than 2.3 and especially preferably not more than 2.0.

Preferably, for the unfunctionalized polymers used to prepare the inventive functionalized polymers, the proportion of low molecular weight constituents with a molecular weight of 500 to 1000 daltons found in the analysis by gel permeation chromatography is not more than 0.4% by mass, preferably not more than 0.3% by mass, more preferably not more than 0.2% by mass and especially not more than 0.15% by mass. Most preferably, the method described cannot detect any constituents with a molecular weight of 500 to 1000 daltons. This achieves the effect that the inventive polymers do not contain any polymer constituents which tend to migration. Since chain cleavage (β-scission) can also occur in the case of free-radical functionalization, it is also possible for low molecular weight polymers to form. The total concentration of low molecular weight polymer chains in the functionalized polymers reaches critical values especially when low molecular weight constituents were already present in the unmodified polyolefin used for functionalization.

Additionally preferably, the proportion of low molecular weight constituents with a molecular weight of less than 500 daltons found in the analysis by high-temperature gel permeation chromatography with universal calibration for the unfunctionalized polymers used to prepare the inventive functionalized polymers is not more than 0.4% by mass, preferably not more than 0.3% by mass, more preferably not more than 0.20% by mass, especially not more than 0.15% by mass. Most preferably, the method described cannot detect any constituents with a molecular weight of <500 daltons. Since chain cleavage (β-scission) can also occur in the case of free-radical functionalization, it is also possible for low molecular weight polymer chains to form. The total concentration of low molecular weight polymer chains in the functionalized polymer reaches critical values especially when low molecular weight constituents were already present in the unmodified polyolefin used for functionalization. When low molecular weight compounds with molar masses of <500 daltons are present in the unmodified polyolefins used to prepare the inventive modified polyolefins, there is the risk that gaseous degradation products form to an increased degree in the free-radical functionalization, which greatly complicate the preparation process (for example by foaming).

In a particular, preferred embodiment, the unfunctionalized polyolefins used to prepare the inventive functionalized polyolefins have a polymer content with a molecular weight of 1000 to 500 daltons determined by ht-GPC with universal calibration of <0.2% by mass, preferably <0.15% by mass, more preferably <0.1% by mass and especially preferably of <0.075% by mass, while simultaneously the polymer content with a molecular weight less than 500 daltons likewise determined by ht-GPC with universal calibration is <0.2% by mass, preferably <0.15% by mass, more preferably <0.1% by mass and especially preferably <0.075% by mass.

In a further particularly preferred embodiment, the unfunctionalized polyolefins used to prepare the inventive functionalized polyolefins have no polymer content with a molecular weight of 1000 to 500 daltons detectable by ht-GPC with universal calibration, while simultaneously no content with a molecular weight of less than 500 daltons can be detected with the ht-GPC method described.

In addition, the unfunctionalized polymers used to prepare the inventive functionalized polymers are notable in that they have, at a temperature of 190° C., a deformation of not more than 1% and a measurement frequency of 1 Hz, a complex melt viscosity of 750 to 100 000 mPa*s, preferably of 800 to 75 000 mPa*s, more preferably of 900 to 50 000 mPa*s and especially preferably of 1000 to 40 000 mPa*s, very particular preference being given to melt viscosities of 750 to 10 000 mPa*s, 850 to 9 000 mPa*s, 900 to 7 500 mPa*s, especially 1 000 to 6 500 mPa*s. This leads to the effect that the processing of the inventive unfunctionalized polyolefins in a free-radically initiated graft polymerization process can provide functionalized polyolefins with different melt viscosities adjusted to the particular application range, the limitation at high melt viscosities leading to the effect that optimal mixing of polymer melt, monomers and/or initiators can always be achieved.

The melts of the unfunctionalized polyolefins used for the functionalization are notable for a certain structural viscosity, which is particularly favourable especially for processing in melt processes. A measure for the structural viscosity of the inventive polymers may be the ratio of the melt viscosity measured at 190° C. and a deformation of not more than 1% at a shear rate of 10 Hz and a shear rate of 0.1 Hz. This ratio for the unfunctionalized polymers used to prepare the inventive functionalized polymers is from 1:1 to 1:10, preferably from 1:1.05 to 1:8, more preferably from 1:1.075 to 1:6 and more preferably from 1:1.1 to 1:5.

The needle penetration of the unmodified polymers used for modification is not more than 60*0.1 mm, preferably in the range of 1-58*0.1 mm, more preferably 3-56*0.1 mm and especially preferably 5-55*0.1 mm, very particular preference being given to value ranges of 1-30*0.1 mm, 1-28*0.1 mm, 2-26*0.1 mm, 3-24*0.1 mm, 3-20*0.1 mm, 4-17*0.1 mm, 5-16*0.1 mm and especially 6-15*0.1 mm. This achieves the effect that the unmodified polymers used in accordance with the invention have an optimal ratio of strength and plasticity, which is particularly advantageous for processing in or from the melt (very good melting behaviour).

The unmodified polymers used in accordance with the invention are predominantly semicrystalline in nature, i.e. have a significant crystalline content. This is manifested in melting peaks in the first and/or second heating of the polymers in DSC. Irrespective of the number and shape of the melting peaks, the melting peak maxima for the inventive polyolefins in the measurement by means of a differential calorimeter (DSC) in the 1st heating are in the range from 35 to 140° C. It is preferred that the measurement in the differential calorimeter (DSC) in the first heating can detect 1-3 melting peaks, in which case, in the case of three melting peaks, the first melting peak maximum is at temperatures of 35-50° C., the second at temperatures of 50-115° C. and the third at temperatures of 70-140° C., more preferably at temperatures of 75-135° C. When only two melting peaks occur, the first melting peak maximum is in the range from 40 to 110° C., the second in the range from 55 to 140° C., more preferably in the range from 58 to 137° C. When only one melting peak occurs, the melting peak maximum is in the range from 40 to 140° C., preferably from 60 to 140° C., more preferably from 70 to 140° C. and especially preferably from 78 to 138° C. Irrespective of the number and shape of the melting peaks, the melting peak maxima for the unmodified polyolefins in the measurement by means of a differential calorimeter (DSC) in the 2nd heating are in the range from 50 to 140° C. In the second heating in the differential calorimeter, the unmodified polymers preferably have 0, 1 or 2 melting peaks. In the case of two melting peaks, the first melting peak maximum is at 50 to 110° C., the second melting peak maximum at 70-140° C., more preferably 73-135° C. When only one melting peak is present, the melting temperature is 60 to 140° C., more preferably 62-137° C. According to the copolymer composition, the polymers have a tendency to cold crystallization, in which case (if present) the exothermic cold crystallization peak in the 2nd heating is in the range from 5 to 40° C. This achieves the effect that the unmodified polymers have an optimal ratio of crystalline and non-crystalline units and exhibit optimal thermal properties especially in the case of processing (for example in the case of free-radical graft modification in the melt).

Unlike highly crystalline polyolefins which have a single, very sharp melting peak, the unmodified polymers in the 2nd heating curve of the DSC measurement at a heating rate of 10 K/min have either no melting peak, one melting peak or two melting peaks, in which case these melting peaks may have different intensities. When the inventive polymers in the 2nd heating curve of the DSC measurement do not exhibit a melting peak, this does not mean that they do not possess any crystalline contents, but merely that they are not detected as a consequence of the standardized test conditions. In the first heating curve, all polymers exhibit at least one melting peak. The end of the melting range of the 2nd heating curve of the DSC (known as peak offset) for the inventive polymers is in the range from 70° C. to 145° C., preferably in the range from 75° C. to 143° C., more preferably in the range from 79° C. to 142° C. and especially preferably in the range from 80° C. to 140° C.

Preferably, the unmodified polymers used for modification have an endothermic enthalpy of fusion measured in the second heating in the DSC of not more than 30 J/g, preferably of 1-27 J/g, more preferably of 2-25 J/g and especially preferably of 3-23 J/g, very particular preference being given to the value ranges of 0-10 J/g, 6-22 Jg, 10-20 J/g and especially 5-15 J/g. This achieves the effect that both the unmodified polymers and the modified polymers prepared therefrom have an optimal ratio of crystalline and non-crystalline components. According to the polymer composition and polymerization conditions selected, it is possible to provide polymers whose melting requires only a very low or else moderate energy contribution (compared to highly crystalline polyolefins), which in turn is an advantage for processing in the melt.

In a very particularly preferred embodiment, the unmodified polymers used for modification have an endothermic enthalpy of fusion measured in the 2nd heating in the DSC of 0 J/g (i.e. no endothermicity detectable), and at the same time a needle penetration of 20-60*0.1 mm, preferably of 20-55*0.1 mm and more preferably of 27-53*0.1 mm. This combination has the advantage that it is possible to provide polymers which require only an exceptionally low energy for melting, but simultaneously have good strength.

The glass transition temperature of the unmodified polymers, determined by means of DSC from the 2nd heating curve, is not more than 8° C., preferably in the range from −9 to −55° C., more preferably in the range from −10 to −52° C. and especially preferably in the range from −12 to −50° C., particular preference being given to value ranges from −8 to −18° C., −9 to −17° C., −10 to −16° C. and from −20 to −48° C., −25 to −45° C. and especially −27 to −44° C. This achieves the effect that both the unmodified polymers and the modified polymers prepared therefrom, according to polymer composition and polymerization conditions selected, can also be used in application sectors which require high low-temperature flexibility and therefore remain closed to highly crystalline polyolefins (for example isotactic polypropylene). It is especially remarkable in this case that the low glass transition temperatures can be achieved for the inventive unmodified polymers even without the use of expensive comonomers, for example 1-pentene, 1-hexene, 1-octene, 1-nonene and/or 1-decene.

In addition, according to the copolymer composition, the softening point of the unmodified polymers used in accordance with the invention for modification, measured by the ring & ball method, is not more than 145° C., preferably 75-142° C., more preferably 80-140° C. and especially 83 to 138° C., particular preference being given to the value ranges from 80 to 118° C., 90 to 115° C. and from 116 to 135° C. and especially 120 to 135° C. This achieves the effect that it is possible to provide polymers which, in spite of a relatively low crystallinity, even in the uncross-linked state, undergo softening only at high temperatures, and hence enable adhesive bonds with high thermal stability.

A special feature of the unmodified polymers is that appropriate selection of the polymer composition and of the polymerization conditions also makes it possible to provide polymers which have no melting peak in the 2nd heating in the DSC, but nevertheless have a softening point (ring & ball) of more than 90° C., preferably of more than 95° C. and more preferably of more than 97° C.

The unmodified polymers used for modification preferably have, at room temperature, a solubility in xylene of at least 10% by mass, preferably a solubility of at least 50% by mass, preferably of at least 55% by mass, more preferably of at least 57% by mass and especially preferably of 60-100% by mass. This has the advantage that polymers can be provided with good to very good solubility in xylene, which, in contrast to systems with this property known to date, have a very narrow molar mass distribution with exceptionally low low molecular weight content with exceptionally low low molecular weight contents, such that polymers are also provided which, in spite of their solubility in xylene, have a measureable crystalline content (at least in the first heating of the DSC) and a clearly identifiable melting temperature (at least in the first heating of the DSC). The unmodified polymers with high solubility in xylene enable the simple preparation of free-radically modified polymers by solvent-based preparation processes. In a particular, preferred embodiment, the unmodified polymers used for modification have a complex melt viscosity (determined at 190° C. with a deformation of not more than 1% and a measurement frequency of 1 Hz) of not more than 15 000 mPa*s, preferably of not more than 10 000 mPa*s, more preferably of not more than 7500 mPa*s and especially preferably of not more than 5500 mPa*s, while at the same time the solubility thereof in xylene at room temperature is at least 70% by mass, preferably at least 75% by mass, more preferably at least 80% by mass and especially preferably more than 90% by mass.

The unmodified polymers preferably additionally have a solubility in tetrahydrofuran (THF) at room temperature of at least 10% by mass, preferably of at least 25% by mass, more preferably of at least 50% by mass and especially preferably of 60-100% by mass.

This has the advantage that nonpolar polymers with good solubility can be provided in a polar solvent (for example for modification in solvent-based preparation processes), which, in contrast to systems with this property known to date, have a high number-average molar mass and a very narrow molar mass distribution with exceptionally low low molecular weight contents. More particularly, the exothermic fusion energy determined in the second heating of the DSC for the unmodified polymers used to prepare the inventive modified polymers and having 100% solubility in tetrahydrofuran at room temperature is not more than 20 J/g, preferably in the range from 1 to 18 J/g and more preferably in the range from 2 to 17 J/g. At the same time, the softening temperature determined by the ring and ball method is at least 80° C., preferably at least 83° C. and more preferably at least 85° C., and especially preferably 90-130° C., while the needle penetration is not more than 55*0.1 mm, preferably not more than 50*0.1 mm, more preferably not more than 45*0.1 mm and especially preferably 1-40*0.1 mm.

In addition, the inventive unmodified polymers for modification are notable in that they have, without further additives, after at least 24 hours of storage time, a tensile strength in the tensile test of at least 0.2 MPa, preferably of at least 0.5 MPa, more preferably of at least 1 MPa and especially of 1.25 to 20 MPa, and/or an absolute elongation of at least 10%, preferably of at least 15%, more preferably of at least 40% and especially preferably of 50-1200%, further preferred ranges being from 40 to 250%, from 150 to 650%, from 300 to 750%, from 500 to 950% and from 600 to 1100%.

In a very particularly preferred embodiment, the unmodified polyolefins used in accordance with the invention for modification have a tensile strength of at least 1 MPa, preferably of at least 2 MPa and especially preferably of at least 3 MPa, while the absolute elongation at break is simultaneously at least 150%, preferably at least 250%, more preferably at least 350% and especially preferably at least 500%.

In a further very particularly preferred embodiment, the unmodified polyolefins used for modification simultaneously have a melt viscosity at 190° C. of <5000 mPa*s, a tensile strength of at least 1 MPa and a softening temperature (determined by the ring and ball method) of >90° C.

The unmodified polyolefins used for modification are prepared by contacting a metallocene catalyst with at least one first solvent, the at least one first solvent being an nonhalogenated aliphatic solvent, at least one methylaluminoxane component modified by alkyl groups, which is optionally present dissolved and/or suspended in a second solvent, the second solvent being a nonhalogenated solvent which may be the same as or different from the first solvent, and at least one 1-olefin monomer in a reaction chamber, and then polymerizing the at least one 1-olefin monomer at a reaction temperature to form inventive polyolefins, characterized in that the reaction temperature is above the boiling temperature of the first solvent(s). It is essential that the reaction temperature in the steady reaction state is above the boiling temperature of the first solvent(s) and preferably simultaneously below the softening point (determined by the ring & ball method) of the polymer prepared in accordance with the invention. More particularly, the polymerization temperature in the steady reaction state is at least 10 K below the softening temperature, preferably at least 15 K, more preferably at least 20 K and especially preferably at least 25 K. The latter is a particularly outstanding characteristic of the process according to the invention, because there is no formation of macroscopic polymer particles (as present, for instance, in a slurry polymerization) in the polymerization medium in spite of this temperature regime on application of the process according to the invention, and polymerization instead proceeds in a homogeneous phase.

The at least one first solvent is selected from nonhalogenated cyclic and/or linear aliphatic solvents. The solvent preferably has a boiling temperature at standard pressure of not more than 101° C. The aliphatic solvents preferably have a boiling temperature at standard pressure of not more than 80° C., preferably of not more than 60° C., more preferably of not more than 40° C. and especially preferably of not more than 20° C.

More particularly, the nonhalogenated aliphatic solvents are cyclic and/or linear aliphatic compounds having not more than 7 carbon atoms, preferably having not more than 6 carbon atoms and more preferably having not more than 5 carbon atoms. The nonhalogenated aliphatic solvent is more preferably selected from the group comprising propane, butane, pentane, cyclopentane, methylcyclopentane, hexane, cyclohexane, methylcyclohexane, heptane or mixtures thereof. The solvent is most preferably propane and/or n-butane.

The metallocene catalyst which is used with preference in the present process is selected from compounds of the formula I

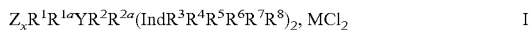

$$Z_xR^1R^{1a}YR^2R^{2a}(IndR^3R^4R^5R^6R^7R^8)_2, MCl_2 \qquad I$$

in which M is a transition metal selected from the group comprising Zr, Hf and Ti, preferably Zr, in which Ind is indenyl and in which $Z_xR^1R^{1a}YR^2R^{2a}$ joins the indenyl radicals as a bridge, where Z and Y are selected from carbon and/or silicon, where x=0 or 1, in which $R^1$, $R^{1a}$ and $R^2$ and $R^{2a}$ are each independently selected from H, linear or branched alkyl groups having 1 to 6 carbon atoms, alkoxylalkyl groups having 1 to 6 carbon atoms, aryl groups or alkoxyaryl groups having 6 to 10 carbon atoms, and where $R^3$ to $R^8$ are selected from the group comprising H and/or linear or branched alkyl groups having 1 to 10 carbon atoms, alkylaryl groups, arylalkyl groups oder aryl groups having 6 to 10 carbon atoms.

The $R^3$, $R^5$ and/or $R^7$ radicals are preferably selected from the group comprising H and/oder linear or branched alkyl groups having 1 to 10 carbon atoms or aryl groups having 6 to 10 carbon atoms, especially linear or branched alkyl groups having 1 to 10 carbon atoms. When $R^6$ and $R^7$ are not both substituted by H, $R^6$ and $R^7$ are especially preferably joined to one another, especially in the form of a fused benzyl ring. More preferably, $R^3$ to $R^8$ are each hydrogen, i.e. the indenyl ring is unsubstituted. In a particular embodiment, the indenyl ligands are tetrahydroindenyl ligands.

The metallocene compound is preferably one of the formula II

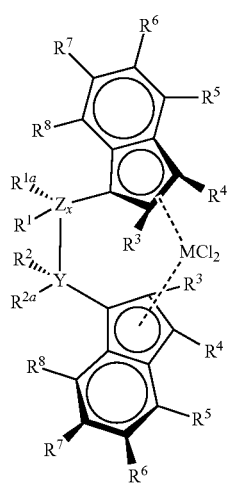

in which $R^1$ to $R^8$ are each as defined above.

Linear and branched alkyl groups having 1 to 10 carbon atoms are especially substituents selected from the group comprising methyl, ethyl, propyl, isopropyl, butyl, tert-butyl, pentyl, hexyl, heptyl, octyl, nonyl or decyl.

Alkoxyl groups having 1 to 4 carbon atoms are especially selected from the group comprising methoxy, ethoxy, isopropyloxy and tert-butyloxy.

Aryl groups having 6 to 10 carbon atoms are especially selected from the group comprising benzyl, phenyl and indenyl.

Alkylaryl groups having 6 to 10 carbon atoms are especially selected from the group comprising methylenephenyl, methyleneindenyl and ethylbenzyl.

Arylalkyl groups having 6 to 10 carbon atoms are especially selected from the group comprising methylphenyl, dimethylphenyl, ethylphenyl, ethylmethylphenyl and methylindenyl.

Alkoxyaryl groups having 6 to 10 carbon atoms are especially selected from the group comprising methoxyphenyl, dimethoxyphenyl, ethyoxyphenyl, methoxy-ethoxyphenyl and methoxyindenyl, where at least one of the alkoxy groups present is in the para position to the bond of the substituent.

More particularly, $Z_xR^1R^{1a}YR^2R^{2a}$ is selected from the group comprising —CH$_2$—, —HCCH$_3$—, —C(CH$_3$)$_2$—, —CH$_2$CH$_2$—, —C(CH$_3$)$_2$C(CH$_3$)$_2$—, —CH$_2$C(CH$_3$)$_2$—, —Si(CH$_3$)$_2$—, —Si(CH$_3$)$_2$Si(CH$_3$)$_2$—, —Si(CH$_3$)$_2$C(CH$_3$)$_2$—, —C(CH$_3$)$_2$Si(CH$_3$)$_2$—, —C(C$_6$H$_5$)$_2$—, —C(C$_6$H$_4$OCH$_3$)$_2$—, —C(OCH$_2$C$_6$H$_5$)$_2$—, —C(OCH$_3$)$_2$—, —C(OCH$_3$)$_2$C(OCH$_3$)$_2$— and —CH$_2$C(OCH$_3$)$_2$—.

The metallocene compound in the present process according to the invention is most preferably ethylidenebis(indenyl) zirconium dichloride, diphenylsilyl-bis(indenyl)zirconium dichloride, dimethylmethylene-bis(indenyl)zirconium dichloride, dimethylsilyl-bis(2-methylindenyl)zirconium dichloride, dimethylsilyl-bis(2-methyl-4,6-diisopropylindenyl)-zirconium dichloride or dimethylsilyl-bis(2-methyl-benzoindenyl)-zirconium dichloride or ethylidenebis(tetrahydroindenyl)zirconium dichloride.

The compounds mentioned are preferably present in the form of a racemic enantiomer mixture and especially preferably do not contain the enantiomorphic, optically inactive meso form to a significant degree. The proportion of the meso form in the present invention is not greater than 5% by mass, preferably not greater than 2% by mass and especially preferably not greater than 1% by mass.

The catalyst is supplied to the polymerization chamber preferably together with a high excess of aliphatic hydrocarbon(s), more preferably of the first solvent, particular preference being given to supplying it in homogeneous form, i.e. dissolved completely.

The 1-olefin monomers used in the polymerization can in principle be selected from all 1-olefins known to those skilled in the art. In particular, the at least one 1-olefin monomer is selected from the group comprising ethylene and linear 1-olefins. Suitable linear 1-olefins are especially propene and/or 1-butene.

The at least one methylaluminoxane component modified by alkyl groups serves in the process according to the invention as a cocatalyst. More particularly, the cocatalyst is a compound of the formula III for the linear type

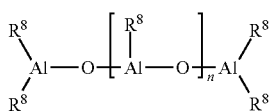

and/or of the formula IV for the cyclic type

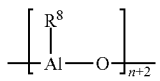

where, in the formulae III and IV, $R^8$ is methyl and/or isobutyl and n is an integer of 2 to 50. In particular, 15 to 45 mol % of the $R^8$ radicals are isobutyl, preferably 17 to 45 mol %, more preferably 19 to 43 mol % and especially preferably 20 to 40 mol %. Only the proportion of isobutyl radicals enables solubility of the cocatalyst in nonaromatic solvents. The cocatalyst is preferably present dissolved in a second solvent whose boiling temperature is especially preferably not more than 101° C. The second solvent of the cocatalyst is especially selected from linear alkanes having 3-7 carbon atoms, preferably having 4-6 carbon atoms, the boiling temperature of the second solvent preferably being significantly below the polymerization temperature, though this is not obligatory. In particular, the second solvent is propane, n-butane, n-pentane, cyclopentane, methylcyclopentane, n-hexane, cyclohexane, methylcyclohexane and/or n-heptane.

The reaction chamber for performing the preparation process may be a stirred tank, a stirred tank cascade with at least two stirred tanks, a flow tube and/or a flow tube with forced conveying (for example a screw machine). It is possible for the abovementioned reactors to be used either as an individual solution or in any desired combination.

The molar mass can be regulated via the selected polymerization temperature and/or the metered addition and mixing of gaseous hydrogen into the polymerization mixture; the molar mass is more preferably controlled without the use of gaseous hydrogen only via the selection of the appropriate polymerization temperature. In the case that hydrogen is used to regulate the molar mass, it is preferably metered into the liquid reaction phase, the metered addition being effected via the base of the reaction chamber and/or via a mixing unit used, for example a stirrer.

The polymer obtained is obtained after the polymerization either by precipitation in a precipitant of opposite polarity (for instance water and/or alcohols, for example ethanol, isopropanol or butanol) or by direct degassing with a subsequent melting operation. After the degassing, the polymer prepared can be subjected to a further finishing step, the finishing step being an additivation and/or a pulverization and/or a pelletization and/or a granulation. Direct further processing of the molten polymer is also possible.

In the inventive functionalized polyolefins, monomers having one or more functional groups have been grafted onto the unfunctionalized base polymers described above. The monomers to be grafted on preferably have olefinic double bonds. More particularly, the monomers having one or more functional groups are selected from the group of the carboxylic acids and/or carboxylic acid derivatives (for example maleic anhydride, maleic acid, itaconic acid, itaconic anhydride, citric anhydride, acrylic acid, methacrylic acid), of the acrylates (for example hydroxymethyl acrylate, hydroxyethyl acrylate, hydroxypropyl acrylate, methyl methacrylate, ethyl methacrylate, butyl methacyrlate, glycidyl methacylate, etc.), of the vinylsilanes (for example vinyltrimethoxysilane, vinyltriethoxysilane, vinyltris(2-methoxyethoxy)silane, 3-methacryloyloxypropyltrimethoxysilane, 3-methacryloyloxypropyltriethoxysilane, vinyldimethylethoxysilane and/or vinylmethyldibutoxysilane, especially vinyltrimethoxysilane), of the vinylaromatics (for example styrene, α-methylstyrene, divinylbenzene, aminostyrene, styrenesulphonic acid, etc.), of the cyclic imido esters and the vinyl compounds thereof (e.g. isopentenyl-2-oxazoline, ricinoloxazoline maleate, etc.), of the vinylimidazolines (e.g. 1-vinylimidazole), of the vinylpyrrolidones (e.g. N-vinylpyrrolidone), and/or of the alicyclic vinyl compounds (for example 4-vinyl-1-cyclohexene, vinylcyclohexane, vinylcyclopentane, etc.).

The modified polymers have particular properties, some of which are attributable to the properties of the base polymers used for modification, some of them to the graft monomers used, and some of them to the process used for modification, or a combination.

With regard to the properties of the inventive modified polyolefins, the influence of the modification on the material properties in particular should be noted. For instance, especially vinylsilanes with alkoxy groups tend to crosslink in the presence of moisture, such that the material properties (for example melt viscosity, needle penetration, softening point, etc.) are altered according to the storage conditions. The properties listed hereinafter should be understood (unless explicitly stated otherwise) as properties of uncrosslinked materials without further additives.

Thus, the melt viscosity of the inventive modified (grafted) polyolefin in the uncrosslinked state, determined by oscillation rheometry at 1 Hz and a deformation of not more than 1% at 190° C., is 500-95 000 mPa*s, preferably 1000-85 000 mPa*s, more preferably 1500-75 000 mPa*s and especially preferably 2000-65 000 mPa*s, further preferred ranges being from 2500 to 5500, 5000 to 12 500, 9000 to 17 500, 15 000 to 27 500 and from 20 000 to 60 000 mPa*s. The melts of the inventive modified polymers exhibit both viscoelastic and structural viscous behaviour. Therefore, modified polyolefins are provided which, on the basis of their variable melt viscosity in the uncrosslinked state, are suitable for a wide variety of different application methods, and can correspondingly also be used in a wide variety of different fields of application (for example melt-applied adhesives, sealants, moulding materials, primers, etc.). A particular feature of the inventive modified polyolefins is that their structural viscosity (i.e. the dependence of the melt viscosity on the shear rate) in the uncrosslinked state increases with rising molecular weight.

The softening point of the uncrosslinked inventive modified (grafted) polyolefin, measured by the ring & ball method, is 80 to 155° C., preferably 85 to 150° C., more preferably 87 to 145° C., and especially preferably 90 to 140° C., further preferred ranges being from 90 to 99° C., from 98 to 110° C., from 108 to 122° C. and from 120 to 140° C. Therefore, modified polyolefins are provided which, according to the polymer composition and monomers grafted on, have a low to moderate softening point, i.e. on the one hand, even in the uncrosslinked state, lead to sufficient thermal stability of a bond produced using the inventive modified polyolefins, but on the other hand also permit processing (in particular in the melt) at moderate processing and application temperatures, and are therefore also suitable for thermally sensitive applications. The needle penetration of the uncrosslinked inventive modified polyolefin is from 2 to 45*0.1 mm, preferably from 3 to 40*0.1 mm, more preferably from 4 to 35*0.1 mm and especially preferably from 5 to 30*0.1 mm. Modified polyolefins are thus provided which, in the uncrosslinked state, have a good balance between strength/hardness and flexibility.

The tensile strength of the inventive modified polyolefins is (without further additives) in the uncrosslinked state in the range from 1 to 25 MPa, preferably in the range from 1.5 to 20 MPa, more preferably in the range from 2 to 18 MPa and especially preferably in the range from 2.5 to 16 MPa, further preferred ranges being from 2 to 7.5 MPa, from 5 to 13 MPa, from 7.5 to 15 MPa and from 10 to 16 MPa. This especially ensures high base cohesion in the uncrosslinked state. The elongation at break determined in the tensile test for the inventive modified polyolefins is (without further additives), in the uncrosslinked state, in the range from 10 to 1200%, preferably in the range from 15 to 1100%, more preferably in the range from 20 to 1000% and especially preferably in the range from 20 to 900%, further preferred ranges being from 25 to 225%, from 200 to 450% and from 400 to 850%. This provides modified polyolefins which possess a high degree of flexibility in the uncrosslinked state.

In a particularly preferred embodiment, the needle penetration of the uncrosslinked inventive modified polyolefin is not more than 15*0.1 mm, preferably not more than 12*0.1 mm and especially preferably in the range from 2 to 10*0.1 mm, while the softening point is simultaneously in the range from 80 to 140° C., preferably in the range from 90 to 135° C. and especially preferably in the range from 95 to 132° C., the tensile strength simultaneously being not more than 15 MPa, preferably not more than 12 MPa, more preferably not more than 10 MPa and especially preferably in the range from 2 to 9 MPa, the elongation at break simultaneously being not more than 500%, preferably not more than 450%, more preferably not more than 400% and especially preferably in the range from 40 to 380%.

In a particularly preferred embodiment, at least one of the monomers used for modification is a silicon-containing monomer, especially a vinylsilane. The inventive modified polyolefins have, in this case (after complete removal of unreacted residual monomer), a silicon content determined by XRF spectroscopy (X-ray fluorescence spectroscopy) of at least 0.25% by mass, preferably of at least 0.30% by mass, more preferably of at least 0.35% by mass and especially preferably of 0.40-2% by mass, further particularly preferred ranges being from 0.4 to 0.75% by mass, from 0.7 to 0.95% by mass, from 0.8 to 1.25% by mass and from 1.1 to 2% by mass. The inventive modified polymers which have a silicon content of at least 0.25% by mass are notable especially in that they have (without further additives), after a storage time of at least 14 days in a climate-controlled cabinet (20° C./65% relative air humidity), in a pure polypropylene bond (material: untreated isotactic polypropylene), an adhesive shear strength of at least 1.5 N/mm$^2$, preferably of at least 1.75 N/mm$^2$, more preferably of at least 2 N/mm$^2$ and especially preferably of at least 2.25 N/mm$^2$. In addition, they are notable in that they (without further additives), in a pure wood bond (wood type: untreated beech), after at least 14 days of storage in a climate-controlled cabinet (20° C./65% relative air humidity), have an adhesive shear strength of at least 1.5 N/mm$^2$, preferably of at least 2.0 N/mm$^2$, more preferably of at least 2.05 N/mm$^2$ and especially preferably of at least 3.0 N/mm$^2$.

In a further particularly preferred embodiment, at least one of the monomers used for modification is carboxylic acid or a carboxylic anhydride. In this case, the oxygen content determined by elemental analysis is especially at least 0.1% by mass, preferably at least 0.15% by mass, more preferably at least 0.2% by mass and especially preferably at least 0.25% by mass. These inventive modified polyolefins are notable especially for very good adhesion to metals, especially to aluminium. The inventive modified polymers which have an oxygen content of at least 0.1% by mass are notable especially in that they (without further additives), after a storage time of at least 14 days in a climate-controlled cabinet (20° C./65% relative air humidity), in a pure aluminium bond (material: untreated aluminium, 99.5), have an adhesive shear strength of at least 0.5 N/mm$^2$, preferably of at least 0.6 N/mm$^2$, more preferably of at least 0.7 N/mm$^2$ and especially preferably of at least 0.75 N/mm$^2$.

In a further particularly preferred embodiment, at least one of the monomers used for modification is an acrylate or methacrylate. In this case, the oxygen content determined by elemental analysis is at least 0.15% by mass, preferably at least 0.25% by mass, more preferably at least 0.3% by mass and especially preferably at least 0.35% by mass. These inventive modified polyolefins are notable especially for good adhesion to acrylate-based polymers, for example polymethyl methacrylate, and to untreated polyolefin surfaces. The inventive acrylate-modified polymers which have an oxygen content of at least 0.15% by mass are notable especially in that they (without further additives), after a storage time of at least 14 days in a climate-controlled cabinet (20° C./65% relative air humidity), in a pure PMMA bond ("7N" moulding material, Evonik Röhm GmbH; bonding temperature 200° C.), have an adhesive shear strength of at least 0.5 N/mm$^2$, preferably of at least 0.75 N/mm$^2$, more preferably of at least 1.0 N/mm$^2$ and especially preferably of at least 1.25 N/mm$^2$.

In a further particularly preferred embodiment, at least one of the monomers used for modification is a silane acrylate. In this case, the silicon content determined by XRF spectroscopy (X-ray fluorescence spectroscopy) is at least 0.15% by mass, preferably at least 0.20% by mass, more preferably at least 0.25% by mass and especially preferably 0.30-2% by mass.

These inventive modified polyolefins are notable especially for a good adhesion to glass, metals, untreated polyolefins and PMMA, and are simultaneously crosslinkable, which leads to very high tensile shear strengths.

Polyolefins with preferred properties mentioned are very particularly suitable for adhesive bonds, especially for use as or in hotmelt adhesives, and exhibit advantageous properties compared to known systems. This is especially true of the further-improved adhesion to untreated polyolefins, especially to untreated polypropylene and also paper/paperboard, wood, glass, polar polymers, for example polycarbonate, polyethylene terephthalate, etc., and/or metals, especially aluminium.

The present invention further provides processes for preparing an inventive modified polyolefin, characterized in that a semicrystalline polyolefin with an ethylene content, determined by $^{13}$C NMR spectroscopy, of not more than 30% by mass contains 70-98% by mass or not more than 30% by mass of propylene and/or either 70-100% by mass or not more than 25% by mass of 1-butene, where the sum of the proportions is 100% by mass, which has the additional feature that the triad distribution thereof, likewise determined by $^{13}$C NMR, for propene triads (in the case that the polymers contain propene triads) has an atactic content of 20-55% by mass, a syndiotactic content of not more than 30% by mass and an isotactic content of 40-80% by mass, and/or the triad distribution for 1-butene triads (in the case that the inventive polymers contain 1-butene triads), determined by $^{13}$C NMR, has an atactic content of 2-85% by mass and a syndiotactic content of not more than 20% by mass, where the contents of isotactic, syndiotactic and atactic triads of propene and 1-butene each add up to 100%, the unfunctionalized polymer having been prepared using a metallocene catalyst, and contacted with at least one free-radical initiator and monomers having one or more functional groups, followed by a graft reaction of the monomers having one or more functional groups onto the polyolefin.

The one or more monomers may be grafted onto the base polymer by all prior art methods, for example in solution or preferably in the melt, in which case one or more free-radical donors is/are used in a sufficient amount. A suitable method can be found in DE-A 40 00 695, to which explicit reference is made. For example, the following free-radical donors can be used: diacyl peroxides, for example dilauryl peroxide or didecanoyl peroxide, alkyl peresters, for example tert-butyl peroxy-2-ethylhexanoate, perketals, for example 1,1-di(tert-butylperoxy)-3,3,5-trimethylcyclohexane or 1,1-di(tert-butylperoxy)cyclohexane, dialkyl peroxides, for example tert-butyl cumyl peroxide, di(tert-butyl) peroxide or dicumyl peroxide, carbon free-radical donors, for example 3,4-dimethyl-3,4-diphenylhexane or 2,3-dimethyl-2,3-diphenylbutane, and azo compounds, for example azobisisobutyronitrile, 2,2'-azodi(2-acetoxypropane), etc. The grafting is effected especially at a temperature of 30 to 250° C.

In a particular embodiment, the process is a solution process, wherein aliphatic and/or aromatic hydrocarbons and/or cyclic ethers can be used as solvents. Particular preference is given to using at least one aromatic hydrocarbon as the solvent. Suitable aromatic hydrocarbons are especially trichlorobenzene, dichlorobenzene, toluene and xylene, particular preference being given to using xylene. Particularly preferred aliphatic hydrocarbons are, for example, propane, n-butane, hexane, heptane, cyclohexane and octane. A particularly preferred cyclic ether is tetrahydrofuran (THF).

When ethers, especially cyclic ethers, are used as solvents, the initiator used and the reaction conditions have to be selected with particular care in order to suppress or to control the formation of explosive peroxides of the ethers used. More particularly, the additional use of specific inhibitors (e.g. IONOL) should be considered.

In the case of a grafting process in solution, the concentration of the base polymer used is at least 10% by mass, preferably at least 15% by mass, more preferably at least 20% by mass and especially preferably at least 22.5% by mass. The reaction temperature of the grafting process in solution is 30 to 200° C., preferably 40 to 190° C., more preferably 50 to 180° C. and especially preferably 55 to 140° C. The solution grafting is effected either in a batchwise or continuous manner. In the case of a batchwise reaction regime, the solid polymer (for example in the form of granules, powder, etc.) is first dissolved in the solvent used. Alternatively, a conditioned polymerization solution from the preparation process of the base polymer is used directly, and brought to reaction temperature. This is followed by the addition of the monomer/of the monomers and of the free-radical initiator(s). In a particularly preferred embodiment, solvent, base polymer(s) and monomer(s) are initially charged and brought to reaction temperature, while the free-radical initiator(s) is/are metered in continuously over a defined period. This has the advantage that the steady-state free-radical concentration is low, and therefore the ratio of graft reaction to chain cleavage is particularly favourable (i.e. more graft reaction and less chain cleavage). In a further particularly preferred embodiment, solvent and base polymer(s) are initially charged and brought to reaction temperature, while monomer(s) and free-radical initiator are metered in continuously—together (for example in the form of a mixture) or separately from one another—over a defined period. This has the advantage that both the steady-state free-radical concentration and the monomer concentration at the reaction site are low, which suppresses both chain cleavage and the formation of homopolymers. This is important especially in the case of use of monomers which have a strong tendency to thermally initiated (homo)polymerization at reaction temperature. After the different defined periods of metered addition, very particular preference is given to metering in a further amount of free-radical initiator(s) in order to minimize the content of residual monomers in the reaction solution. The reactor used is preferably a stirred tank; the use of alternative reaction vessels, for example batchwise kneading reactors, is likewise possible, and is preferred especially in the case of low reaction temperatures and/or high polymer concentrations.

In the case of a continuous reaction regime, the solid polymer is first dissolved in at least one solvent in one or more reservoir vessels (for example stirred tanks), and then metered continuously into the reaction vessel(s). In an alternative, likewise particularly preferred embodiment, a conditioned polymer solution from a preparation process of the base polymer is used directly. In a further, likewise particularly preferred embodiment, the solid polymer (for example in the form of powder, granules, pellets, etc.) is metered together with at least one solvent continuously into a (single- or multishaft) screw machine or a Contikneter continuous kneader, dissolved under the action of temperature and/or shear, and then metered continuously into the reaction vessel(s). Useful reaction vessels or reactors for the performance of the continuous graft reaction in solution include continuous stirred tanks, stirred tank cascades, flow tubes, flow tubes with forced conveying (e.g. screw machines), reaction kneaders and any desired combinations thereof. When flow tubes with forced conveying are used, they are preferably extruders, in which case it is possible to use single-shaft, twin-shaft or multishaft extruders. Particular preference is given to using twin-shaft and/or multishaft extruders. Especially preferred for continuous preparation of the inventive modified polymers in solution is the use of a reactor combination composed of flow tube, flow tube with forced conveying and continuous stirred tank in any sequence, in which case the removal of residual monomers and volatile by-products/degradation products is preferably also effected either in the flow tube with forced conveying or in the continuous stirred tank. A preferred alternative is a melt process wherein at least one free-radical initiator is metered directly into the melt. In particular, in this process variant, the temperature of the polymer material at the time of metered addition of at least one free-radical initiator is above the SADT (Self-accelerating decomposition temperature=temperature above which self-accelerating decomposition can set in) of at least one of the free-radical initiators metered in.

The reaction temperature of the graft process in the melt is 160-250° C., preferably 165-240° C., more preferably 168 to 235° C. and especially preferably 170 to 230° C.

The melt grafting is effected either in batchwise or continuous mode. In the case of a batchwise reaction regime, the solid polymer (for example in the form of granules, powder, pellets, etc.) is first melted and optionally homogenized. Alternatively, a conditioned polymer melt from a polymerization process is used directly and brought to reaction temperature. This is followed by the addition of monomer(s) and free-radical initiator(s).

In a particular embodiment, monomer(s) and polymer melt are mixed homogeneously and brought to reaction temperature, while the free-radical initiator(s) is/are metered in continuously over a defined period. This has the advantage that the steady-state free-radical concentration is low, and therefore the ratio of graft reaction to chain cleavage is particularly favourable (i.e. more graft reaction and less chain cleavage). In a further particularly preferred embodiment, the polymer melt is initially charged and homogenized, while monomer(s) and free-radical initiator are metered in continuously, together (for example in the form of a mixture) or separately, over a defined period. This has the advantage that both the steady-state free-radical concentration and the monomer concentration at the reaction site remain low, which suppresses both chain cleavage and the formation of homopolymer. The latter is important particularly in the case of use of monomers which tend to thermal (homo) polymerization at the reaction temperature present. The reactor used is preferably a stirred tank with a close-clearance stirrer unit or a reaction kneader.

In the case of a continuous reaction regime, the solid polymer is first melted in one or more reservoir vessels (for example stirred tanks) and then metered continuously into the reaction vessel(s). In an alternative, likewise particularly preferred embodiment, a conditioned polymer melt from a polymerization process is used directly. In a further, likewise particularly preferred embodiment, the solid polymer (for example in the form of powder, granules, pellets, etc.) is metered continuously into a (single-shaft or multishaft) screw machine or a Contikneter continuous kneader, melted under the action of temperature and/or shear, and then metered continuously into the reaction vessel(s). Useful reaction vessels or reactors for the performance of the continuous graft reaction in the melt include continuous stirred tanks, stirred tank cascades, flow tubes, flow tubes with forced conveying (for example screw machines), reaction kneaders, and any combinations thereof. When flow tubes with forced conveying are used, they are preferably extruders, in which case it is possible to use single-shaft, twin-shaft or multishaft extruders. Particular preference is given to using twin-shaft and/or multishaft extruders. Especially preferred for continuous preparation of the inventive modified polymers in the melt is the use of a reactor combination composed of flow tube, flow tube with forced conveying and continuous stirred tank in any sequence, the removal of residual monomers and volatile by-products/degradation products preferably also being effected either in the flow tube with forced conveying or in the continuous stirred tank.

The present invention further provides for the use of the inventive modified polyolefins in moulding materials, as or in adhesives, in marking materials, coating materials, sealing membranes, floor coverings or roof membranes, as primers or in primer formulations and/or adhesion promoter formulations and/or aqueous dispersions, suspensions and/or emulsions. Corresponding moulding materials, adhesives, marking materials, coating materials, roof membranes, floor coverings or roof membranes, primers or primer formulations, adhesion promoter formulations, aqueous dispersions, suspensions and/or emulsions comprising the inventive polymers likewise form part of the subject-matter of the present invention.

In the case of moulding materials, these comprise the inventive polyolefin and at least one further polymer. In a particularly preferred embodiment, at least one inventive modified polyolefin is used as a compatibilizer together with at least two further polymers, in which case the proportion of the inventive modified polyolefins in the moulding materials is not more than 50% by mass, preferably not more than 40% by mass, more preferably not more than 30% by mass and especially preferably not more than 25% by mass.

The further constituents of the inventive moulding materials may especially comprise other polymers, in which case these other polymers may be one or more ethylene polymers and/or isotactic propylene polymers and/or syndiotactic propylene polymers and/or isotactic poly-1-butene polymers and/or syndiotactic poly-1-butene polymers.

In this context, there is especially preferably a significant difference in the melt viscosity between the inventive polymers present and the polymers additionally present, measured by oscillation rheometry at 190° C., the polymers additionally present having at least twice as high a melt viscosity as the inventive polymers, more preferably a melt viscosity at least 3 times as high, more preferably one at least 4 times as high and especially preferably one at least 5 times as high.

The moulding materials mentioned can be used to produce finished products (for example by injection moulding) or to produce films and/or foils.

The inventive modified polymers are preferably used as or in adhesives, especially preferably in adhesive formulations.

The inventive adhesive formulations may contain further constituents in addition to the inventive polymers. The further constituents may especially, in the case of solution formulations, be cyclic and/or linear aliphatic and/or aromatic hydrocarbons, and also corresponding halogenated hydrocarbons. In this context, the good solubility of the inventive polymers in different solvents, for example xylene and tetrahydrofuran, is found to be particularly advantageous. It is thus unnecessary to select halogenated solvents in order to be able to prepare a solution formulation. Preferably, therefore, no halogenated hydrocarbons are used. In the adhesive formulations which are liquid at room temperature, the hydrocarbons mentioned have a formulation content of not more than 90% by mass, preferably not more than 80% by mass, more preferably not more than 75% by mass and especially preferably of not more than 50% by mass.

Most preferably, the inventive adhesive formulation is a hotmelt adhesive formulation which can be used for all kinds of adhesive bonds known to those skilled in the art.

The inventive hotmelt adhesive formulation may contain further constituents which are needed to achieve specific properties, for example deformability, adhesion capacity, processibility, (melt or solution) viscosity, stability, crystallization rate, tack, storage stability, etc. In a particular embodiment of the present invention, the proportion of the further constituents is especially preferably not more than 10% by mass. This has the advantage that the material properties of the adhesive formulation are essentially those of the inventive polymer used. Such an adhesive formulation can be produced with a very low level of complexity.

Alternatively, in a further embodiment of the present invention, the proportion of the further constituents may be >10% by mass. In this case, the further constituents make up not more than 80% by mass of the overall formulation, preferably not more than 60% by mass, more preferably not more than 50% by mass, especially preferably not more than 40% by mass.

The further constituents may be inorganic and/or organic fillers which, as desired, may be electrically conductive or insulating, inorganic and/or organic pigments which may, as desired, be electrically conductive or insulating, synthetic and/or natural resins, especially adhesive resins, synthetic and/or natural oils, inorganic and/or organic, synthetic and/or natural polymers which may, as desired, be electrically conductive or insulating, inorganic and/or organic, synthetic and/or natural fibres which may, as desired, be electrically conductive or insulating, inorganic and/or organic stabilizers, inorganic and/or organic flame retardants.

More particularly, the further constituents include resins, the resins being used in order to adjust particular properties of the adhesive layer, especially the tack and/or adhesion, the flow and creep behaviour of the adhesive layer and/or the adhesive viscosity, to particular requirements. The resins may be natural resins and/or synthetic resins. In the case of natural resins, these natural resins contain, as the main constituent, abietic acid (e.g. rosin). The resins may also be terpene or polyterpene resins, petroleum resins and/or coumarone-indene resins, which are especially so-called $C_5$ resins and/or $C_9$ resins and/or copolymers of $C_5/C_9$ resins. The proportion of the resins in the inventive hotmelt adhesive formulation is especially not more than 45% by mass, preferably in the range from 1 to 40% by mass, more preferably in the range from 2 to 30% by mass and especially preferably in the range from 3 to 20% by mass, based on the overall formulation.

In addition, the inventive hotmelt adhesive formulations may contain conventional amorphous poly($\alpha$-olefins) (known as APAOs) as further constituents. The amorphous poly($\alpha$-olefins) mentioned may be homo/copolymers and/or terpolymers of ethylene, propylene, 1-butene or linear and/or branched 1-olefins having 5-20 carbon atoms, which are obtainable, for example, by conventional Ziegler-Natta catalysis or metallocene catalysis. The proportion of the amorphous poly($\alpha$-olefins) is especially not more than 50% by mass, preferably not more than 40% by mass and more preferably not more than 30% by mass, based on the overall formulation. The further constituents are crystalline or semicrystalline polyolefins, which include especially isotactic polypropylene, syndiotactic polypropylene, polyethylene (HDPE, LDPE and/or LLDPE), isotactic poly(1-butene), syndiotactic poly(1-butene), copolymers thereof and/or copolymers thereof with linear and/or branched 1-olefins having 5 to 10 carbon atoms. It is additionally preferred that the crystalline or semicrystalline polyolefins are chemically modified polyolefins, the chemical modification including especially that by maleic anhydride, itaconic anhydride, acrylic acid, acrylates, methacrylates, unsaturated epoxy compounds, silane acrylates, silanes and hydroxyalkylsilanes.

In addition, the further constituents may include polymers with polar groups. Polymers with polar groups include polystyrene copolymers (for example with maleic anhydride, acrylonitrile, etc), polyacrylates, polymethacrylates, (co)polyesters, polyurethanes, (co)polyamides, polyetherketones, polyacrylic acid, polycarbonates and chemically modified polyolefins (for example poly(propylene-graft-maleic anhydride) or poly(propylene-graft-alkoxyvinylsilane).

In addition, the further constituents may be homo- and/or copolymers based on ethylene, propylene, acrylonitrile, butadiene, styrene and/or isoprene; these polymers are especially block copolymers, especially rubbers, for example natural and synthetic rubber, poly(butadiene), poly(isoprene), styrene-butadiene rubber and nitrile rubber. The proportion of the polymers based on butadiene, styrene and/or isoprene is not more than 20% by mass, preferably 1-15% by mass, more preferably 1.5-10% by mass and especially 2-9% by mass, based on the hotmelt adhesive formulations.

In addition, the further constituents may include elastomeric polymers based on ethylene, propylene, and diene and/or cis,cis-1,5-cyclooctadiene, exo-dicyclopentadiene, endo-dicyclopentadiene and 1,4-hexadiene and 5-ethylidene-2-norbornene; these constituents are especially ethylene-propylene rubber, EPM (double bond-free, ethylene content 40-75% by mass) and/or EPDM. The proportion of polymers based on ethylene, propylene, a diene and/or cis,cis-1,5-cyclooctadiene, exo-dicyclopentadiene, endo-dicyclopentadiene, 1,4-hexadiene and 5-ethylidene-2-norbornene is typically not more than 20% by mass, preferably 1-15% by mass, more preferably 1.5-10% by mass and especially 2-9% by mass, based on the hotmelt adhesive formulations.

Alternatively, the further constituents may include waxes, especially modified and unmodified waxes, which are preferably crystalline, semicrystalline and/or amorphous polyolefin waxes based on polyethylene, polypropylene and/or poly(1-butene), paraffin waxes, metallocene waxes, microwaxes, polyamide waxes, polytetrafluoroethylene waxes and/or Fischer-Tropsch waxes. The proportion of the waxes is not more than 50% by mass, preferably not more than 1-40% by mass, more preferably 2-30% by mass and especially preferably 3-20% by mass, based on the hotmelt adhesive formulations.

In addition, the further constituents may include fillers, the fillers being used in order to adjust specific property profiles of the adhesive layer, for example the temperature application range, the stability, the shrinkage, the electrical conductivity, the magnetism and/or the thermal conductivity, to specific requirements in a controlled manner. Generally, the fillers are inorganic and/or organic fillers. The inorganic fillers are especially selected from silicas (incl. hydrophobized silicas), quartz flour, chalks, barite, glass particles (especially spherical particles to increase light reflection), glass fibres, carbon fibres, asbestos particles, asbestos fibres and/or metal powders. Organic fillers are, for example, carbon black, bitumen, crosslinked polyethylene, crosslinked unvulcanized or vulcanized rubber mixtures, synthetic fibres, for example polyethylene fibres, polypropylene fibres, polyester fibres, polyamide fibres, Aramid fibres, Saran fibres, MP fibres, or natural fibres such as straw, wool, cotton, silk, flax, hemp, jute and/or sisal. The proportion of the fillers is not more than 80% by mass, preferably 1-60% by mass, more preferably 5-40% by mass and especially preferably 7-30% by mass, based on the hotmelt adhesive formulations.

The further constituents may likewise include stabilizers, which may be used in order to protect the adhesive formulation from external influences, for example the influence of (processing) heat, shear stress, solar irradiation, air humidity and oxygen. Suitable stabilizers are, for example, hindered amines (HALS stabilizers), hindered phenols, phosphites and/or aromatic amines. In the formulations mentioned, the proportion of the stabilizers is not more than 3% by mass, preferably in the range from 0.05 to 2.5% by mass and especially preferably in the range from 0.1 to 2% by mass, based on the hotmelt adhesive formulations.

In addition, the further constituents may include one or more oils, which may be natural and/or synthetic oils. These one or more oils preferably have, at the processing temperature, a viscosity of 1 to 1000 mPa*s, preferably of 2-750 mPa*s, most preferably of 3-500 mPa*s. Suitable oils are, for example, mineral oils, (medical) white oils, isobutene oils, butadiene oils, hydrogenated butadiene oils and/or paraffin oils. The proportion of the one or more oils is not more than 50% by mass, preferably 1-45% by mass, more preferably 3-40% by mass and especially 5-38% by mass, based on the hotmelt adhesive formulations.

In addition, the hotmelt adhesive formulations may contain inorganic and/or organic pigments, UV-active substances, organic and/or inorganic nucleating agents which accelerate the crystallization of the polymers and hence reduce the open time of the adhesive bond.

In a further preferred embodiment of the inventive hotmelt adhesive formulations, the formulations described above are multiphase blends.

The inventive hotmelt adhesive formulations can be applied to the surface to be bonded especially by means of spray application, as bead(s) and/or by knife-coating.

The present invention further provides adhesive bonds containing one or more polymers of the present invention. More particularly, the adhesive bonds are packaging adhesive bonds, adhesive bonds of hygiene articles, wood adhesive bonds, adhesive bonds of glass surfaces, label adhesive bonds, lamination adhesive bonds, carpet or synthetic turf adhesive bonds, shoe adhesive bonds, pressure-sensitive adhesive bonds, book adhesive bonds or textile adhesive bonds.

In the case of packaging adhesive bonds, the packaging materials may comprise the materials of wood, cardboard, paper, plastic, metal, ceramic, glass, synthetic and/or natural fibres and/or textiles. The packaging materials are preferably nonpolar polymers, especially polyethylene, polypropylene, poly(1-butene) or copolymers thereof with linear and/or branched $C_{2-20}$ 1-olefins, for example uncrosslinked polyethylene, for example LDPE, LLDPE and/or HDPE, and/or (e.g. silane-) crosslinked polyolefin, especially silane-crosslinked polyethylene. In addition, the nonpolar polymers may especially be polystyrene, polybutadiene, polyisoprene homo- and/or copolymers, and/or copolymers thereof with linear and/or branched $C_{2-20}$ 1-olefins or dienes, for example EPDM, EPM or EPR, and/or synthetic or natural rubber.

In the case of polar polymers, they are especially polyacrylates, especially polyalkyl methacrylates, polyvinyl acetate, polyesters and/or copolyesters, especially polyethylene terephthalate and/or polybutylene terephthalate, polyamides and/or copolyamides, acrylonitrile copolymers, especially acrylonitrile/butadiene/styrene copolymers and/or styrene/acrylonitrile copolymers, maleic anhydride copolymers, especially S/MA copolymers and/or MA-grafted polyolefins, for example polypropylene and/or polyethylene, polyvinyl chloride and/or polycarbonates. Generally, the packaging materials may be present in the form of a carton, box, container, sheet, panel, film and/or foil. For example, corresponding polymer films can be produced by means of extrusion, calendering, blow-moulding, casting technology, solution drawing, thermoforming or a combination of a plurality of these techniques. For example, the polymer films are monolayer films which are oriented or unoriented. In the case of orientation of the monolayer film, monoaxial, biaxial or multiaxial orientation may be present, in which case the axes of orientation may be at any angle to the film draw direction. Alternatively, the polymer films may be multilayer films, in which case the film layers may be manufactured from the same material or from different materials. The multilayer films may be oriented or unoriented. In the case of orientation of the multilayer polymer films, a monoaxial, biaxial or multiaxial orientation may be present, in which case the axes of orientation may be at any angle to the film draw direction. In a particular embodiment, the multilayer polymer film is a composite film. In the adhesive bonding of composite films, one or more of the film layers may consist of composite material, in which case the composite materials may be present in continuous form (for example paper, aluminium film or the like) and/or discontinuous form (for example particles/fibres). In particular, in the case of adhesive bonding of plastics packaging materials according to the present invention, generally no chemical and/or energetic pretreatments of the polymer surfaces (e.g. plasma, corona treatment, etching, sulphonation, etc) is needed for the achievement of adhesion.

In the case of adhesive bondings of wood packaging materials, the wood packaging may be solid real wood, real wood laminates, polymer laminates, MDF panels or similar wood-like substances. It is possible to use either low-resin or low-oil woods, for example beech, oak, etc., but also resin-rich or oil-rich woods, such as teak, pine, etc.

In the packaging adhesive bonds mentioned, preferably at least one of the inventive polymers present has an open time of less than 30 seconds.

There are in principle no restrictions in the adhesive bonds of hygiene articles; for example, they may be nappies, napkins, etc. In general, the inventive adhesive bond forms a multilayer structure which includes different materials, for example polymer films and nonwovens. In addition, moisture-absorbing substances, for example polyacrylic acid particles, may be present in the adhesive bond.

A further field of use of the inventive adhesive bonds is structural wood adhesive bonds, especially edge gluing and/or decorative paper covering and/or decorative film lamination and/or assembly adhesive bonds.

A further significant field of use of the inventive adhesive bonds is that of adhesive bonds involving a glass surface. In this case, the adhesive bond may contain moisture-absorbing substances, for example silica gel, polyacrylic acid particles, etc. The composite in this context is preferably a multipane insulating glass composite.

For this purpose, all types of multipane insulation glass composites known to those skilled in the art are suitable, irrespective of the individual construction, for example with or without further spacers.

In addition, a lamination can be carried out in the case of inventive adhesive bonds involving a glass surface.

Furthermore, the glass surface may be the surface of glass fibres, for example the surface of a glass fibre cable, as used, for example, for data and/or telephone lines.

In a further embodiment of the present invention, the article to be adhesive bonded is a label. The label may consist of a paper film, polymer film, metal foil and/or multilayer film and may especially be used for the labelling of lacquered, coated, anodized and/or otherwise surface-treated metal cans, especially tin plate cans, and glass or plastic (especially PET) bottles. In particular, the adhesive for label adhesive bonds may be a so-called "pressure-sensitive" adhesive (PSA).

In a further embodiment of the present invention, the adhesive bonds are a lamination, in which case the surface to be laminated may be the surface of an inorganic and/or organic substance, preferably made of metals (e.g. steel, aluminium, brass, copper, tin, zinc, enamel), of glass, of ceramics and/or inorganic building materials, for example open- or closed-pore concrete. In addition, the surface may be wood, paper, cardboard and/or plastics. The surface may itself be a composite material composed of inorganic and organic materials (for example glass fibre composite materials). In this case, the colaminated lamination material may be of inorganic and/or organic nature. Examples of colaminated inorganic lamination materials are ultrathin glass panes, ceramic membranes and/or metal foils (e.g. aluminium foil). Corresponding examples of colaminated organic lamination materials are paper, cardboard, wood varnish, plastics, natural and/or synthetic textiles, nonwovens, synthetic leather and/or natural leather.

It will be appreciated that the inventive adhesive bonds may also be an adhesive bond in an automobile interior (for example sun visors, roof liners, etc).

In a further preferred embodiment of the present invention, the adhesive bonds are for producing carpets and/or synthetic turf. In particular, the adhesive bond is used for tuft and filament binding. The fibres or fibre composites to be bound may be natural and/or synthetic fibres. Examples of natural fibres or fibre composites are wool, cotton, sisal, jute, straw, hemp, flax, silk and/or mixtures of these fibres. Examples of synthetic fibres or fibre composites to be bound are (co) polyamide fibres, polyethylene fibres, (co)polyester fibres, polypropylene fibres and/or mixtures of these fibres. In the case of synthetic turf adhesive bonds, the filaments bound by the adhesive bond are selected from polypropylene filaments, polyethylene filaments, polyamide filaments, polyester filaments or mixed filaments of the polymers listed.

Preference is given to using the adhesive bond for coating of carpet backing. In addition, a textile substrate can additionally be colaminated. The resulting carpet elements are, for example, so-called metre products, carpet tiles or a subsequently deformable automotive carpet. In the applications mentioned for tuft and filament binding, the inventive polyolefin present has a melt viscosity at 190° C. of not more than 10 000 mPa*s, preferably of 500 to 8000 mPa*s, more preferably of 600 to 6000 mPa*s and especially preferably of 750 to 4000 mPa*s. The proportion of the inventive polyolefins is especially 60-98% by mass. The application weight is especially 20-1500 g/m$^2$. Further examples are within the technical ability of a person skilled in the art.

In addition, the inventive adhesive bonds may be shoe adhesive bonds, which can be used, for example, in the sports shoes sector and/or for producing so-called split leather.

Adhesive bonds likewise in accordance with the invention are so-called "pressure-sensitive adhesive bonds" (PSAs). It is advantageous here when at least one of the inventive polymers and/or formulation constituents present has "cold flow" (i.e. a melting point below room temperature). Formulation constituents with cold flow are, for example, poly(1-hexene), poly(1-octene), poly(1-hexene-co-1-octene), polyacrylates, etc.

In the case of book adhesive bonds, the bonds are generally an adhesive bond which is undertaken in the book-binding operation.

In the case of textile adhesive bonds, a plurality of textile layers can be bonded to one another at particular points or extensively, and the textile elements to be bonded may include natural or synthetic materials. In particular, the natural textile elements are wool, horsehair, cotton, linen fabric, hemp, jute, sisal, flax, straw and/or leather. Preferred synthetic textile elements contain, as constituents, polypropylene, polyethylene, (co)polyamides, (co)polyesters, nylon, perlon and/or Keflar®. In particular, one or more of the elements to be bonded may be an insert. In a particular embodiment, the inventive adhesive formulation is introduced in the form of a powder between the textile layers to be adhesive bonded and activated by thermal energy (for example with the aid of an ironing press).

In a likewise inventive embodiment of the present invention, the inventive polymers can be used in marking materials, coating materials, sealing membranes or roof membranes.

The inventive marking materials may contain the further constituents already mentioned in the description of the moulding materials and adhesive formulations. For example, the inventive marking materials can be used as road marking materials.

In the case of coating materials, the material may, for example, be a coating material for cardboard or paper coating.

In addition, the inventive polymers are suitable for use in sealing membranes. In addition to the inventive polymers, the sealing membranes may contain further constituents; more particularly, the further constituents may be other polymers, fillers and bitumen. In the case of roof membranes, the proportion of the inventive polymers is not more than 30% by mass, preferably not more than 27% by mass, more preferably not more than 25% by mass and especially preferably not more than 22% by mass, based on the roof membrane. In particular, the sealing membranes are roof membranes. In the case of the roof membranes, at least one of the inventive polymers has a glass transition temperature of not more than −10° C., preferably of not more than −15° C., more preferably of not more than −18° C. and especially preferably of not more than −20° C.

In addition, the inventive polymers are suitable for use as primers, adhesion promoters or in primer formulations and/or in adhesion promoter formulations, especially the absence of halogenated organic constituents being advantageous. In particular, primer and adhesion promoter formulations which contain the inventive polymers are used in order to achieve adhesion of organic coatings and/or adhesives to untreated polyolefin surfaces, especially to untreated polypropylene. In a specific case, the primer and/or adhesion promoter formulations are applied as a primer to polypropylene mouldings, for example automotive shock absorbers and/or lining parts, in order to achieve better adhesion of the subsequent paint system.

In addition, the inventive polymers are suitable for use in aqueous dispersions, suspensions and/or emulsions. In addition to the inventive polymers, it is possible for surface-active substances (for example inorganic and/or organic surfactants of ionic and/or nonionic nature) and further polymers, especially those with polar monomer units (for example poly (propylene-graft-maleic anhydride)), to be present in the dispersions, suspensions and/or emulsions. The aqueous dispersions, suspensions and/or emulsions are preferably prepared using a solution of the inventive polymers, especially in tetrahydrofuran or xylene. Preparation using a melt of the inventive polymers is also possible, in which case preference is given to using polymers with a melting/softening temperature of <100° C., especially preferably of <90° C. In the aqueous dispersions, suspensions and/or emulsions mentioned, the proportion of the inventive polyolefins is more than 10% by mass based on the overall formulation.

Even without any further remarks, it is assumed that a person skilled in the art can utilize the above description to the widest possible degree. The preferred embodiments and examples should consequently be interpreted merely as descriptive disclosure which should in no way whatsoever be interpreted as a limitation.

The present invention will be illustrated in detail hereinafter with reference to examples. Alternative embodiments of the present invention are obtainable in analogous manner.

EXAMPLES

Analysis:
a) High-temperature $^{13}$C NMR

The polymer composition is determined by means of high-temperature $^{13}$C NMR. $^{13}$C NMR spectroscopy of polymers is described, for example, in the following publications:
[1] S. Berger, S. Braun, H.-O. Kalinowski, $^{13}$C-NMR-Spektroskopie [$^{13}$C NMR Spectroscopy], Georg Thieme Verlag Stuttgart 1985
[2] A. E. Tonelli, NMR Spectroscopy and Polymer Microstructure, Verlag Chemie Weinheim 1989
[3] J. L. Koenig, Spectroscopy of Polymers, ACS Professional Reference Books, Washington 1992
[4] J. C. Randall, Polymer Sequence Determination, Academic Press, New York 1977
[5] A. Zambelli et al: Macromolecules, 8, 687 (1975)
[6] A. Filho, G. Galland: J. Appl. Polym. Sci., 80, 1880 (2001)
b) High-temperature GPC The molecular weight is determined by means of high-temperature GPC. The determination is carried out to ASTM D6474-99, but at a higher temperature (160° C. instead of 140° C.) and a lower injection volume of 150 µl instead of 300 µl. Further literature cited for the GPC analysis of polymers is:

H. G. Elias: "Makromoleküle"; vol. 2; Wiley-VCH; Weinheim 2001;
Z. Grubisic, P. Rempp, H. Benoit; Polym. Lett.; 5; 753 (1967);
K. A. Boni, F. A. Sliemers, P. B. Stickney; J. Polym. Sci.; A2; 6; 1579 (1968);
D. Goedhart, A. Opschoor; J. Polym. Sci.; A2; 8; 1227 (1970);
A. Rudin, H. L. W. Hoegy; J. Polym. Sci.; A1; 10; 217 (1972);
G. Samay, M. Kubin, J. Podesva; Angew. Makromol. Chem.; 72; 185 (1978);
B. Ivan, Z. Laszlo-Hedvig, T. Kelen, F. Tüdos; Polym. Bull.; 8; 311 (1982);
K.-Q. Wang, S.-Y. Zhang, J. Xu, Y. Li, H. P. Li; J. Liqu. Chrom.; 5; 1899 (1982);
T. G. Scholte, H. M. Schoffeleers, A. M. G. Brands; J. Appl. Polym. Sci.; 29; 3763 (1984).

The solvent used is trichlorobenzene. The analysis is effected at a column temperature of 160° C. The universal calibration used for the evaluation of the elution curves is carried out on the basis of polyolefin standards. The results are not comparable to analyses whose calibrations were effected on the basis of another kind of polymer—for example based on polystyrene—or which had been effected without universal calibration, since an inadmissible comparison of different three-dimensional polymer structures and/or hydrodynamic radii is otherwise made. The comparison with measurements using solvents other than that specified is also inadmissible, since different three-dimensional polymer structures and/or hydrodynamic radii may be present in different solvents, which leads to a different result in the molecular weight determinations.

The polydispersity $P_d$ is defined as the quotient of number-average and weight-average molar mass. It is more particularly a measure of the breadth of the molar mass distribution present, which in turn permits conclusions about the polymerization behaviour present. It is determined by means of high-temperature GPC. Within certain limits, a polydispersity is characteristic for a particular catalyst-cocatalyst combination. The polydispersity has a relatively strong influence on the tack of the material at room temperature, and on the adhesion.

In the determination of the molar masses by means of gel permeation chromatography (GPC), the hydrodynamic radius of the polymer chains present in solution plays a crucial role. As well as thermal conductivity, RI (refractive index) and UV/VIS and FTIR or light scattering detectors, the detection mechanisms used are also viscosity detectors. When the polymer chain is considered as an undisturbed ball, the relationship between its limiting viscosity number and the molar mass can be described empirically by the so-called KMHS equation $$[\eta] = K_V M_V^\alpha$$

(H.-G. Elias, Makromoleküle, volume 2, 6th edition, Wiley-VCH, Weinheim 2001, p. 411-413). $K_V$ and α here are constants which are influenced both by the constitution, configuration and molar mass of the polymer, and by the solvent and the temperature. The significant conclusion of the alpha value in the present invention is that of the hydrodynamic radius, which depends more or less on the branch sites present on the polymer chains. The alpha value is high in the case of low branching, and low in the case of higher branching.

c) Rheology

The rheological measurements are effected to ASTM D 4440-01 ("Standard Test Method for Plastics: Dynamic Mechanical Properties Melt Rheology") using an Anton Paar MCR 501 rheometer with a plate-plate geometry (plate diameter: 50 mm) as the oscillation meter. The maximum sample deformation used in all measurements is 1%; the temperature-dependent measurements are carried out at a measurement frequency of 1 Hz and a cooling rate of 1.5 K/min.

The melt viscosity is determined by oscillation rheometry, working at a shear rate of 1 Hz. The maximum deformation of the sample is selected such that the sample is within the linear viscoelastic range over the entire analysis time. Compared to Hookean solids, viscoelastic materials are notable for the ability to dissipate stresses resulting from a deformation over a particular time (relaxation). In contrast to Newtonian liquids, which are subject to exclusively irreversible deformation under the action of shearing/elongation, viscoelastic fluids can recover a portion of deformation energy once the shear force has been removed (so-called "memory effect") [N. P. Cheremisinoff; "An Introduction to Polymer Rheology and Processing"; CRC Press; London; 1993]. A further characteristic of polymeric melts is the occurrence of a so-called structural viscosity. This refers to behaviour in which the shear stress as the force which occurs degrades the starting structure of the material as a function of the shear rate. Since this degradation process requires a minimum shear rate, the material flows like a Newtonian liquid under this shear rate. An explanation is given by the Le Chatelier principle, the "evasion" of the structurally-viscous liquid (to evade the mechanical stress) being in the direction along the shear surfaces to reduce the frictional resistance. The latter leads to the degradation of the equilibrium structure of the starting state and to the formation of a shear-oriented structure, which in turn has the consequence of easier flow (viscosity reduction). In polymer melts, the Newtonian region is perceptible only at very low shear rates and/or low shear amplitudes. Its determination is possible by means of rheometric test methods (amplitude "sweeps", i.e. measurement at fixed frequency as a function of the shear amplitude), and is necessary when the measurement is to be carried out in a reversible, i.e. reproducible, range [R. S. Lenk; "Rheologie der Kunststoffe" [Rheology of the Plastics]; C. Hanser Verlag; Munich; 1971; J. Meissner; "Rheologisches Verhalten von Kunststoff-Schmelzen und -Lösungen" [Rheological behaviour of polymer melts and solutions] in: "Praktische Rheologie der Kunststoffe" [Practical rheology of the plastics]; VDI-Verlag; Dusseldorf; 1978; J.-F. Jansson; Proc. 8 th. Int. Congr. Rheol.; 1980; Vol. 3]. Owing to the low force which acts therein, its low deformation and the consequently minor effect on the sample morphology, vibrational rheometry is particularly suitable for the study of materials which exhibit structurally-viscous behaviour.

d) Needle Penetration

The needle penetration is determined to DIN EN 1426.

e) DSC

The melting enthalpy, the glass transition temperature and the melting range of the crystalline fraction are determined by means of differential scanning calorimetry (DSC) to DIN 53 765 from the 2nd heating curve at a heating rate of 10 K/min. The turning point of the heat flow curve is evaluated as the glass transition temperature.

f) Xylene Solubility

A xylene isomer mixture is used, the polymer being dissolved under reflux and then the solution being cooled to room temperature.

2 g of polyolefin are dissolved in 250 ml of xylene with stirring and heating up to the boiling point of xylene. Once the mixture has been boiled under reflux for 20 min, the polymer solution is allowed to cool to 25° C. Undissolved and precipitated polyolefin is additionally filtered off with suction (15 cm suction filter, Sartorius 390 filter paper) and dried. The remaining polymer solution is precipitated in a 5-fold excess of methanol (with one drop of 37 percent aqueous HCl). The resulting precipitate is filtered off with suction and dried at 80° C. in a drying cabinet (vacuum).

g) Solubility in THF

Solubility in THF is a characteristic of semicrystalline polyolefins. The procedure is analogous to the dissolution tests in xylene.

h) Tensile Strength and Elongation at Break

The tensile strength and elongation at break are determined to DIN EN ISO 527-3.

i) Softening Point (Ring & Ball)

The softening point is determined by the ring and ball method to DIN EN 1427.

j) Adhesive Shear Strength

The adhesive shear strength is determined to DIN EN 1465.

k) XRF Spectroscopy

The samples which have been poured into aluminium dishes and cured are cut out with a cutting die (diameter 30 mm). The determination is effected as a double determination. The layer thickness of the polymer samples is >5 mm. The samples are placed in a sample holder and analysed (instrument: PANalytical PW 2404). The quantitative determination is effected against an external calibration of Si in borax tablets.

The test methods described relate to every measurement in the context of the present invention, irrespective of whether the base polymer to be grafted or the inventive polyolefin is involved.

Examples of Modified Polyolefins a) Preparation (Polymerization) of the Base Polymers The base polymers are prepared as described in DE102008005947.

b) Inventive Base Polymers and Noninventive Base Polymers

The polymer composition (Table 1) and the microstructure of the polymers prepared are determined by means of high-temperature $^{13}C$ NMR.

TABLE 1

| | Polymer from polymerization experiment | | | | | | | | | | |
|---|---|---|---|---|---|---|---|---|---|---|---|
| | 1 | 2 | 4 | 5 | 6 | 7 | 8 | 9 | 10 | 11 | 12 |
| Polymer composition | | | | | | | | | | | |
| Ethylene [% by mass] | 7.4 | 7.5 | 9 | 12.6 | 18.6 | 14.9 | 10 | 7.7 | 4 | 6.9 | 14 |
| Propylene [% by mass] | 77 | 0 | 82 | 74.5 | 81.4 | 85.1 | 90 | 92.3 | 96 | 93.1 | 86 |
| 1-Butene [% by mass] | 15.6 | 92.5 | 9 | 12.9 | 0 | 0 | 0 | 0 | 0 | 0 | 0 |
| Propylene triads | | | | | | | | | | | |
| Isotactic [% by mass] | 75 | — | 74 | 67 | 48 | 53 | 60 | 72 | 74 | 66 | 66 |
| Syndiotactic [% by mass] | 5 | — | 6 | 13 | 19 | 15 | 11 | 7 | 6 | 12 | 10 |
| Atactic [% by mass] | 20 | — | 20 | 20 | 34 | 32 | 29 | 22 | 20 | 23 | 24 |
| 1-Butene triads | | | | | | | | | | | |
| Isotactic [% by mass] | 45 | 68 | 28 | 32 | — | — | — | — | — | — | — |
| Syndiotactic [% by mass] | 5 | 6 | 9 | 9 | — | — | — | — | — | — | — |
| Atactic [% by mass] | 49 | 25 | 63 | 58 | — | — | — | — | — | — | — |
| Ethylene triads [% by mass] | 0.7 | 1.4 | 0.7 | 5.6 | 0.8 | 0.4 | 0.2 | 0 | 0 | 0 | 5.2 |

| | Polymer from polymerization experiment | | |
|---|---|---|---|
| | 3** | 13** | 14** |
| Polymer composition | | | |
| Ethylene [% by mass] | 0 | 0 | 0 |
| Propylene [% by mass] | 26 | 59 | 100 |
| 1-Butene [% by mass] | 74 | 41 | 0 |
| Propylene triads | | | |
| Isotactic [% by mass] | 99 | 75 | 7 |
| Syndiotactic [% by mass] | 0 | 13 | 75 |
| Atactic [% by mass] | 1 | 12 | 18 |
| 1-Butene triads | | | |
| Isotactic [% by mass] | 95 | 80 | — |
| Syndiotactic [% by mass] | 2 | 3 | — |
| Atactic [% by mass] | 3 | 17 | — |
| Ethylene triads [% by mass] | 0 | — | — |

**Noninventive c) Molar Masses, Molar Mass Distribution and Polymer Branching

The molecular weight is determined by means of high-temperature GPC (Table 2).

The determination is performed to ASTM D6474-99, but at a higher temperature (160° C. instead of 140° C.) and with a lower injection volume of 150 μl instead of 300 μl. The low molecular weight constituents are determined from the molar mass distribution curves obtained by integration of the appropriate areas.

TABLE 2

| | Polymer from polymerization experiment | | | |
|---|---|---|---|---|
| | 1 | 2 | 4 | 5 |
| Modality MMV | monomodal | bimodal | monomodal | monomodal |
| $M_w$ [g/mol] | 30000 | 38200 | 83000 | 18400 |
| Pd [—] | 2.6 | 3.0 | 1.5 | 1.6 |
| α [—] | 0.58 | 0.74 | 1.04 | 1.04 |
| Constituents 1000-500 D | 0.3 | 0.01 | 0 | 0 |
| Constituents <500 D | 0 | 0 | 0 | 0 |

| | Polymer from polymerization experiment | | | | |
|---|---|---|---|---|---|
| | 6 | 7 | 8 | 9 | 10 |
| Modality MMV | Monomodal | Monomodal | Monomodal | Monomodal | bimodal |
| $M_w$ [g/mol] | 24900 | 27500 | 22800 | 19200 | 14000 |
| Pd [—] | 1.5 | 1.5 | 1.5 | 1.4 | 1.6 |
| α [—] | 0.83 | 0.82 | 0.86 | 0.93 | 0.82 |
| Constituents 1000-500 D | 0 | 0 | 0 | 0 | 0 |
| Constituents <500 D | 0 | 0 | 0 | 0 | 0 |

| | Polymer from polymerization experiment | | | | |
|---|---|---|---|---|---|
| | 11 | 12 | 3** | 13** | 14** |
| Modality MMV | Bimodal | Monomodal | bimodal | Monomodal | Monomodal |
| $M_w$ [g/mol] | 11600 | 43500 | 56000 | 195000 | 82500 |
| Pd [—] | 1.61 | 2.4 | 2.4 | 8.6 | 1.7 |
| α [—] | 0.82 | 0.56 | 0.76 | 0.68 | 0.75 |
| Constituents 1000-500 D | 0 | 0.1 | 0 | 0.31 | 0 |
| Constituents <500 D | 0 | 0.01 | 0 | 0.19 | 0 |

**Noninventive d) Inventive Modified Polymers

Preparation of the Inventive Modified Polyolefins in the Melt:

A semicrystalline polyolefin (for composition and material parameters see Tables 1 & 2) is mixed in a twin-screw extruder (Berstorff ZE40) with the monomer vinyltrimethoxysilane and the initiator dicumyl peroxide (for amounts see Table 3) at a particular reaction temperature (see Table 3) for approx. 90 seconds (residence time). The excess monomer is evaporated in the last zone of the extruder at a reduced pressure of approx. 20 mbar. This is followed by stabilization by approx. 0.3% by mass of IRGANOX 1076.

TABLE 3

| | Ex. A1 (non-inventive) | Ex. A2 (non-inventive) | Ex. A3 (inventive) | Ex. A4 (inventive) | Ex. A5 (inventive) |
|---|---|---|---|---|---|
| Base polymer according to example | 14 | 13 | 2 | 5 | 6 |
| Base polymer in the extruder feed [% by mass] | 88 | 88 | 88 | 88 | 88 |
| Vinyltrimethoxysilane in the extruder feed [% by mass] | 11 | 11 | 11 | 11 | 11 |

TABLE 3-continued

|  | Ex. A1 (non-inventive) | Ex. A2 (non-inventive) | Ex. A3 (inventive) | Ex. A4 (inventive) | Ex. A5 (inventive) |
|---|---|---|---|---|---|
| Dicumyl peroxide in the extruder feed [% by mass] | 1 | 1 | 1 | 1 | 1 |
| Reaction temperature [° C.] | 170 | 170 | 170 | 170 | 170 |
| Si [% by mass] | 0.7 | 0.8 | 0.7 | 0.5 | 0.3 | e) Adhesive Bonds

Wood Bonds

The polyolefins modified in accordance with the invention are melted at 190° C. in a drying cabinet under protective gas atmosphere (e.g. nitrogen, argon, etc.) for one hour, and then applied at a temperature of 170° C. (with the aid of a temperature sensor) to a wood specimen (wood type: solid beech). This wood specimen is joined within 20 seconds to a further wood specimen (wood type: solid beech) over an area of 4 cm² with a simple overlap, and pressed on with a weight of 2 kg for 5 minutes. Excess adhesive polymer is removed. Subsequently, the bonded specimen is stored for a certain number of days at 20° C./65% rel. air humidity in a climate-controlled cabinet, and is then tested for its mechanical properties by means of tensile testing.

Polypropylene Bonds

The polyolefins modified in accordance with the invention are melted at 190° C. in a drying cabinet under protective gas atmosphere (e.g. nitrogen, argon, etc.) for one hour, and then applied at a temperature of 170° C. (with the aid of a temperature sensor) to a polypropylene specimen (isotactic polypropylene, "PP-DWST"/manufacturer: Simona AG). This polypropylene specimen is joined within 20 seconds to a further polypropylene specimen ("PP-DWST"/manufacturer: Simona AG) over an area of 4 cm² with a simple overlap, and pressed on with a weight of 2 kg for 5 minutes. Excess adhesive polymer is removed. Subsequently, the bonded specimen is stored for a certain number of days at 20° C./65% rel. air humidity in a climate-controlled cabinet, and is then tested for its mechanical properties by means of tensile testing.

Adhesive Bonds of Aluminium 100 g of each of the polyolefins modified in accordance with the invention are melted in a drying cabinet at 180° C. under a protective gas atmosphere (e.g. nitrogen, argon, etc.) for 1 hour. Subsequently, the polymer melt is applied at a specific bonding temperature (with the aid of a temperature sensor) to a aluminium specimen (99.5, dimensions: 100 mm×20 mm×1.5 mm). This aluminium specimen is applied within 20 seconds to a further aluminium specimen (99.5, dimensions: 100 mm×20 mm×1.5 mm) over an area of 4 cm² with a simple overlap, and pressed together with a weight of 2 kg for 5 minutes. Excess adhesive polymer is removed. Subsequently, the bonded specimen is stored for 14 days at 20° C./65% rel. air humidity in a climate-controlled cabinet, and is then tested for its mechanical properties by means of tensile testing.

TABLE 4

|  | Bond | Adhesive shear strength after storage time of 2 weeks [N/mm²] |
|---|---|---|
| Ex. A1 (noninventive) | Beech | 2.89 |
|  | PP | 0.64 |
|  | Alu | 0.22 |
| Ex. A2 (inventive) | Beech | 2.11 |
|  | PP | 1.37 |
|  | Alu | 0.31 |
| Ex. A3 (inventive) | Beech | 4.96 |
|  | PP | 1.42 |
|  | Alu | 0.25 |
| Ex. A4 (inventive) | Beech | 4.12 |
|  | PP | 1.52 |
|  | Alu | 0.29 |
| Ex. A5 (inventive) | Beech | 1.21 |
|  | PP | 2.33 |
|  | Alu | 0.41 |

The inventive examples show better adhesive properties than the corresponding comparative examples based on different base polymers.

The invention claimed is:

1. A modified polyolefin based on unfunctionalized polyolefins which contain not more than 30% by mass of ethylene, either 70-98% by mass or not more than 30% by mass of propylene either 75-95% by mass or not more than 25% by mass of 1-butene, or a combination thereof, where the sum of the proportions is 100% by mass, the triad distribution determined by $^{13}$C NMR for propene triads having an atactic content of 20-34% by mass, a syndiotactic content of 5-19% by mass and an isotactic content of 48-75% by mass, and the triad distribution determined by $^{13}$C NMR for 1-butene triads having an atactic content of 25-63% by mass, a syndiotactic content of 5-9% by mass and an isotactic content of 28-68% by mass, where the contents of isotactic, syndiotactic and atactic triads of propene and 1-butene each add up to 100%, the unfunctionalized polymers having been prepared in the presence of a metallocene catalyst, and monomers having one or more functional groups having been grafted onto the unfunctionalized polyolefins.

2. A modified polyolefin according to claim 1, wherein, in the unfunctionalized polyolefins, the proportion of low molecular weight constituents with a molecular weight of 500 to 1000 daltons, determined by gel permeation chromatography, is not more than 0.4% by mass.

3. A modified polyolefin according to claim 1 wherein, the monomer having functional groups is selected from the group consisting of carboxylic acids, carboxylic acid derivatives, acrylates, vinylsilanes, vinylaromatics, cyclic imido esters, vinyl compounds of cyclic imido esters, vinylimidazolines, vinylpyrrolidones, alicyclic vinyl compounds, and combinations thereof.

4. A modified polyolefin according to claim 1, wherein the unfunctionalized polymers are poly(ethylene-co-propylene) copolymers with an ethylene content of not more than 30% by mass, poly(ethylene-co-1-butene) copolymers with an ethylene content of not more than 30% by mass, poly(propyleneco-1-butene) copolymers with a propylene content of not more than 30% by mass, poly(propylene-co-1-butene) copolymers with a 1-butene content of not more than 25% by mass, or poly(ethylene-co-propylene-co-1-butene) terpolymers with an ethylene content of not more than 28% by mass.

5. A modified polyolefin according to claim 1, wherein the metallocene catalyst is a compound represented by formula I

$$Z_xR^1R^{1a}YR^2R^{2a}(IndR^3R^4R^5R^6R^7R^8)_2MCl_2 \qquad I$$

wherein
M is a transition metal selected from the group consisting of Zr, Hf and Ti,
Ind is indenyl, and
$Z_xR^1R^{1a}YR^2R^{2a}$ joins the indenyl radicals as a bridge, where Z and Y are each selected from the group consisting of carbon and silicon, x=0 or 1, $R^1$, $R^{1a}$ and $R^2$ and $R^{2a}$ are each independently selected from the group consisting of H, linear or branched alkyl groups having 1 to 6 carbon atoms, alkoxylalkyl groups having 1 to 6 carbon atoms, aryl groups or alkoxyaryl groups having 6 to 10 carbon atoms, and
$R^3$ to $R^8$ are selected from the group consisting of H, linear or branched alkyl groups having 1 to 10 carbon atoms, alkylaryl groups, arylalkyl groups and aryl groups having 6 to 10 carbon atoms.

6. A process for preparing a modified polyolefin according to claim 1, wherein at least one semicrystalline polyolefin with an ethylene content, determined by $^{13}C$ NMR spectroscopy, of not more than 30% by mass contains either 70-98% by mass or not more than 30% by mass of propylene and/or either 70-100% by mass or not more than 25% by mass of 1-butene, where the sum of the proportions is 100% by mass, which has the additional feature that the triad distribution thereof, likewise determined by $^{13}C$ NMR, for propene triads has an atactic content of 20-55% by mass, a syndiotactic content of not more than 30% by mass and an isotactic content of 40-80% by mass, the triad distribution for 1-butene triads, determined by $^{13}C$ NMR, has an atactic content of 2-85% by mass and a syndiotactic content of not more than 20% by mass, or a combination thereof, where the contents of isotactic, syndiotactic and atactic triads of propene and 1-butene each add up to 100%,
the unfunctionalized polymer having been prepared in the presence of a metallocene catalyst, and contacted with at least one free-radical initiator and monomers having one or more functional groups, followed by a graft reaction of the monomers having one or more functional groups onto the polyolefin.

7. A process according to claim 6, wherein the monomer having functional groups is selected from the group consisting of carboxylic acids, carboxylic acid derivatives, acrylates, vinylsilanes, vinylaromatics, cyclic imido esters and vinyl compounds thereof, vinylimidazolines, vinylpyrrolidones, the alicyclic vinyl compounds, and combinations thereof.

8. A process according to claim 6, wherein the monomers having one or more functional groups are grafted on in solution or in the melt.

9. A process according to claim 6, wherein the grafting is effected at a temperature of 30 to 250° C.

10. At least one of moulding material, protective material, adhesive, sealant, marking material, coating material, sealing membrane, floor covering or roof membrane, primer, primer formulation, adhesion promoter formulation, dispersion, suspension and an emulsion, comprising one or more modified polyolefins according to claim 1.

11. An adhesive according to claim 10, in the form of a hotmelt adhesive formulation.

12. An adhesive according to claim 10, comprising crosslinking accelerants, inorganic and/or organic fillers, inorganic and/or organic pigments, synthetic and/or natural resins, inorganic and/or organic, synthetic and/or natural polymers, inorganic and/or organic, synthetic and/or natural fibres, inorganic and/or organic stabilizers, inorganic and/or organic flame retardants, resins, amorphous poly(α-olefins), polymers with polar groups, polymers based on ethylene, butadiene, styrene and/or isoprene, elastomeric polymers based on ethylene, propylene, acrylonitrile, a diene and/or a cyclic diene, styrene, waxes, one or more synthetic or natural oils and/or UV-active substances.

13. A sealing membrane according to claim 10, further comprising other polymers, fillers, bitumen, or a combination thereof.

14. An adhesive bond comprising one or more modified polyolefins according to claim 1.

15. An adhesive bond according to claim 14, wherein the adhesive bond is a packaging bond, a bond of hygiene articles, a wood adhesive bond, a bond of glass surfaces, a label bond, a lamination bond, a carpet or synthetic turf bond, a shoe bond, a pressure-sensitive bond, a book bond or a textile bond.

16. At least one of a primer adhesive promoter formulation according to claim 10, comprising one or more polyolefins, which is used to treat a polyolefin surface.

17. At least one of a dispersion, a suspension, and an emulsion according to claim 10, comprising one or more polyolefins, wherein the amount of the polyolefins is more than 10% by mass based on the total amount of the dispersion, the suspension, and the emulsion.

18. A method of treating a polyolefin surface, comprising contacting said surface with a primer or an adhesive promoter formulation according to claim 10.

19. The modified polyolefin according to claim 1, wherein the unfunctionalized polyolefin comprises not more than 30% by mass of propylene.

20. The modified polyolefin according to claim 1, wherein the unfunctionalized polyolefin comprises from 4-18.6% by mass of ethylene, from 77-93.1% by mass of propylene and from 9-15.6% by mass of 1-butene.

21. The modified polyolefin according to claim 1, wherein the unfunctionalized polyolefin comprises from 0.2-5.8% by mass of ethylene triads.

* * * * *